(12) United States Patent
Oizumi et al.

(10) Patent No.: US 9,215,135 B2
(45) Date of Patent: Dec. 15, 2015

(54) TERMINAL DEVICE AND RESPONSE SIGNAL SENDING METHOD

(75) Inventors: Toru Oizumi, Osaka (JP); Daichi Imamura, Beijing (CN); Masayuki Hoshino, Kanagawa (JP); Ayako Horiuchi, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 127 days.

(21) Appl. No.: 14/119,908

(22) PCT Filed: May 18, 2012

(86) PCT No.: PCT/JP2012/003256
§ 371 (c)(1),
(2), (4) Date: Nov. 25, 2013

(87) PCT Pub. No.: WO2012/164855
PCT Pub. Date: Dec. 6, 2012

(65) Prior Publication Data
US 2014/0082431 A1    Mar. 20, 2014

(30) Foreign Application Priority Data
Jun. 3, 2011    (JP) ................................. 2011-125241

(51) Int. Cl.
| H04W 28/04 | (2009.01) |
| H04L 12/24 | (2006.01) |
| H04L 1/00 | (2006.01) |
| H04L 1/20 | (2006.01) |

(52) U.S. Cl.
CPC .......... *H04L 41/0654* (2013.01); *H04L 1/0061* (2013.01); *H04L 1/20* (2013.01)

(58) Field of Classification Search
CPC ........ H04L 5/005; H04L 1/1861; H04L 5/001
See application file for complete search history.

(56) References Cited

U.S. PATENT DOCUMENTS

| 2011/0141878 A1* | 6/2011 | Che et al. ...................... 370/216 |
| 2011/0243066 A1* | 10/2011 | Nayeb Nazar et al. ........ 370/328 |
| 2012/0082145 A1* | 4/2012 | Chen et al. .................... 370/338 |
| 2012/0099491 A1* | 4/2012 | Lee et al. ....................... 370/280 |
| 2012/0134305 A1* | 5/2012 | Damnjanovic et al. ........ 370/280 |

(Continued)

OTHER PUBLICATIONS

3GPP TS 36.211 V10.1.0 (Mar. 2011), 3rd Generation Partnership Project; Technical Specification Group Radio Access Network; Evolved Universal Terrestrial Radio Access (E-UTRA); Physical Channels and Modulation (Release 10).

(Continued)

*Primary Examiner* — Hassan Kizou
*Assistant Examiner* — Hector Reyes Ortiz
(74) *Attorney, Agent, or Firm* — Pearne & Gordon LLP

(57) ABSTRACT

Provided is a terminal (200) which notifies a base station (100) of response signals generated by bundling error detection results for the downlink data of a first band and a second band and in which a calculating unit (204) receives the downlink data for each band, a CRC unit (211) detects any errors in the downlink data, and an answer signal generating unit (212) generates answer signals by bundling error detection results on the basis of the bit number ratio of the error detection results for the first band and the second band, so that the total number of bits in the error detection results for the downlink data obtained using the CRC unit (211) is the number of notification bits in the response signals.

5 Claims, 23 Drawing Sheets

(56) References Cited

U.S. PATENT DOCUMENTS

2012/0275395 A1* 11/2012 Gerstenberger et al. ...... 370/329
2013/0176920 A1* 7/2013 Seo et al. ...................... 370/280
2014/0105076 A1* 4/2014 Yang et al. .................... 370/280

OTHER PUBLICATIONS

3GPP TS 36.212 V10.1.0 (Mar. 2011), 3rd Generation Partnership Project; Technical Specification Group Radio Access Network; Evolved Universal Terrestrial Radio Access (E-UTRA); Multiplexing and channel coding (Release 10).

3GPP TS 36.213 V10.1.0 (Mar. 2011), 3rd Generation Partnership Project; Technical Specification Group Radio Access Network; Evolved Universal Terrestrial Radio Access (E-UTRA); Physical layer procedures (Release 10).

Seigo Nakao, et al., "Performance enhancement of E-UTRA uplink control channel in fast fading environments", 5-3 Hikarino-oka, Yokosuka City, Kanagawa 239-0847 Japan, Apr. 2009.

R1-100909, 3GPP TSG-RAN WG1 #60, Ericsson, ST-Ericsson, "A/N transmission in the uplink for carrier aggregation", San Francisco, USA, Feb. 22-26, 2010.

R1-091702, TSG-RAN WG1 #57, ZTE, "Uplink Control Channel Design for LTE-Advanced", San Francisco, USA, May 4-8, 2009.

R1-091744, 3GPP TSG-RAN WG1 Meeting #57, Panasonic, "UL ACK/NACK transmission on PUCCH for carrier aggregation", San Francisco, USA May 4-8, 2009.

R1-110842, 3GPP TSG RAN WG1 Meeting #64, LG Electronics, "Details on Spatial Bundling for TDD Mode 1 using PUCCH format 3", Taipei, Taiwan, Feb. 21-25, 2011.

International Search Report for Application No. PCT/JP2012/003256 dated Aug. 7, 2012.

* cited by examiner

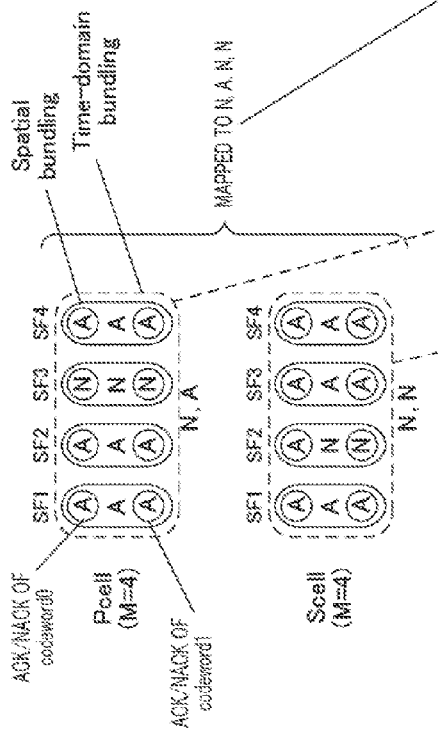
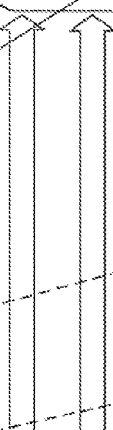
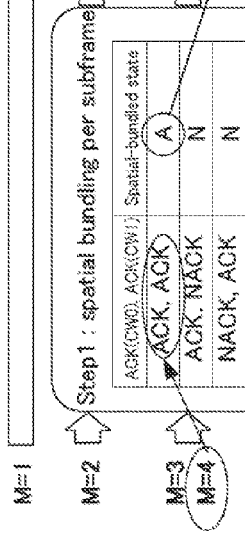
FIG. 6B
FIG. 6A

FIG. 12

| 4bits to 3bits bundling | |
|---|---|
| HARQ-ACK(0), HARQ-ACK(1), HARQ-ACK(2), HARQ-ACK(3) | Mapped state |
| ACK, ACK, ACK, ACK | ACK, ACK, ACK |
| NACK/DTX, ACK, ACK, ACK | NACK, ACK, ACK |
| ACK, NACK/DTX, ACK, ACK | ACK, NACK, ACK |
| ACK, ACK, ACK, NACK/DTX | ACK, ACK, NACK |
| ACK, ACK, NACK/DTX, any | ACK, NACK, NACK |
| ACK, NACK/DTX, any, any except for ACK, NACK/DTX, ACK, ACK | NACK, NACK, ACK |
| NACK/DTX, ACK, any, any except for NACK/DTX, ACK, ACK, ACK | NACK, ACK, NACK |
| NACK/DTX, NACK/DTX, any, any | NACK, NACK, NACK |

TERMINAL DEVICE AND RESPONSE SIGNAL SENDING METHOD

TECHNICAL FIELD

The present invention relates to a terminal apparatus and a response signal transmission method.

BACKGROUND ART

3GPP LTE employs Orthogonal Frequency Division Multiple Access (OFDMA) as a downlink communication scheme. In radio communication systems to which 3GPP LTE is applied, base stations transmit synchronization signals (i.e., Synchronization Channel: SCH) and broadcast signals (i.e., Broadcast Channel: BCH) using predetermined communication resources. Meanwhile, each terminal finds an SCH first and thereby ensures synchronization with the base station. Subsequently, the terminal reads BCH information to acquire base station-specific parameters (e.g., frequency bandwidth) (see, Non-Patent Literature (hereinafter, abbreviated as NPL) 1, 2 and 3).

In addition, upon completion of the acquisition of the base station-specific parameters, each terminal sends a connection request to the base station to thereby establish a communication link with the base station. The base station transmits control information via Physical Downlink Control CHannel (PDCCH) as appropriate to the terminal with which a communication link has been established via a downlink control channel or the like.

The terminal performs "blind-determination" on each of a plurality of control information items included in the received PDCCH signal (i.e., Downlink (DL) Assignment Control Information: also referred to as Downlink Control Information (DCI)). To put it more specifically, each of the control information items includes a Cyclic Redundancy Check (CRC) part and the base station masks this CRC part using the terminal ID of the transmission target terminal. Accordingly, until the terminal demasks the CRC part of the received control information item with its own terminal ID, the terminal cannot determine whether or not the control information item is intended for the terminal. In this blind-determination, if the result of demasking the CRC part indicates that the CRC operation is OK, the control information item is determined as being intended for the terminal.

Moreover, in 3GPP LTE, Automatic Repeat Request (ARQ) is applied to downlink data to terminals from a base station. To put it more specifically, each terminal feeds back a response signal indicating the result of error detection on the downlink data to the base station. Each terminal performs a CRC on the downlink data and feeds back Acknowledgment (ACK) when CRC=OK (no error) or Negative Acknowledgment (NACK) when CRC=Not OK (error) to the base station as a response signal. An uplink control channel such as Physical Uplink Control Channel (PUCCH) is used to feed back the response signals (i.e., ACK/NACK signals (hereinafter, may be referred to as "A/N," simply)).

The control information to be transmitted from a base station herein includes resource assignment information including information on resources assigned to the terminal by the base station. As described above, PDCCH is used to transmit this control information. This PDCCH includes one or more L1/L2 control channels (L1/L2 CCH). Each L1/L2 CCH consists of one or more Control Channel Elements (CCE). More specifically, a CCE is the basic unit used to map the control information to PDCCH. Moreover, when a single L1/L2 CCH consists of a plurality of CCEs (2, 4 or 8), a plurality of contiguous CCEs starting from a CCE having an even index are assigned to the L1/L2 CCH. The base station assigns the L1/L2 CCH to the resource assignment target terminal in accordance with the number of CCEs required for indicating the control information to the resource assignment target terminal. The base station maps the control information to physical resources corresponding to the CCEs of the L1/L2 CCH and transmits the mapped control information.

In addition, CCEs are associated with component resources of PUCCH (hereinafter, may be referred to as "PUCCH resource") in a one-to-one correspondence. Accordingly, a terminal that has received an L1/L2 CCH identifies the component resources of PUCCH that correspond to the CCEs forming the L1/L2 CCH and transmits a response signal to the base station using the identified resources. However, when the L1/L2 CCH occupies a plurality of contiguous CCEs, the terminal transmits the response signal to the base station using a PUCCH component resource corresponding to a CCE having a smallest index among the plurality of PUCCH component resources respectively corresponding to the plurality of CCEs (i.e., PUCCH component resource associated with a CCE having an even numbered CCE index). In this manner, the downlink communication resources are efficiently used.

As illustrated in FIG. 1, a plurality of response signals transmitted from a plurality of terminals are spread using a Zero Auto-correlation (ZAC) sequence having the characteristic of zero autocorrelation in time-domain, a Walsh sequence and a discrete Fourier transform (DFT) sequence, and are code-multiplexed in a PUCCH. In FIG. 1, ($W_0$, $W_1$, $W_2$, $W_3$) represent a length-4 Walsh sequence and ($F_0$, $F_1$, $F_2$) represent a length-3 DFT sequence. As illustrated in FIG. 1, ACK or NACK response signals are primary-spread over frequency components corresponding to 1 SC-FDMA symbol by a ZAC sequence (length-12) in frequency-domain. More specifically, the length-12 ZAC sequence is multiplied by a response signal component represented by a complex number. Subsequently, the ZAC sequence serving as the response signals and reference signals after the primary-spread is secondary-spread in association with each of a Walsh sequence (length-4: $W_0$-$W_3$ (may be referred to as Walsh Code Sequence)) and a DFT sequence (length-3: $F_0$-$F_2$). More specifically, each component of the signals of length-12 (i.e., response signals after primary-spread or ZAC sequence serving as reference signals (i.e., Reference Signal Sequence) is multiplied by each component of an orthogonal code sequence (i.e., orthogonal sequence: Walsh sequence or DFT sequence). Moreover, the secondary-spread signals are transformed into signals of length-12 in the time-domain by inverse fast Fourier transform (IFFT). A CP is added to each signal obtained by IFFT processing, and the signals of one slot consisting of seven SC-FDMA symbols are thus formed.

The response signals from different terminals are spread using ZAC sequences each corresponding to a different cyclic shift value (i.e., index) or orthogonal code sequences each corresponding to a different sequence number (i.e., orthogonal cover index (OC index)). An orthogonal code sequence is a combination of a Walsh sequence and a DFT sequence. In addition, an orthogonal code sequence is referred to as a block-wise spreading code in some cases. Thus, base stations can demultiplex the code-multiplexed plurality of response signals using the related art despreading and correlation processing (see, NPL 4).

However, it is not necessarily true that each terminal succeeds in receiving downlink assignment control signals because the terminal performs blind-determination in each subframe to find downlink assignment control signals intended for the terminal. When the terminal fails to receive the downlink assignment control signals intended for the terminal on a certain downlink component carrier, the terminal would not even know whether or not there is downlink data intended for the terminal on the downlink component carrier. Accordingly, when a terminal fails to receive the downlink assignment control signals intended for the terminal on a certain downlink component carrier, the terminal generates no response signals for the downlink data on the downlink component carrier. This error case is defined as discontinuous transmission of ACK/NACK signals (DTX of response signals) in the sense that the terminal transmits no response signals.

In 3GPP LTE systems (may be referred to as "LTE system," hereinafter), base stations assign resources to uplink data and downlink data, independently. For this reason, in the 3GPP LTE system, terminals (i.e., terminals compliant with LTE system (hereinafter, referred to as "LTE terminal")) encounter a situation where the terminals need to transmit uplink data and response signals for downlink data simultaneously in the uplink. In this situation, the response signals and uplink data from the terminals are transmitted using time-division multiplexing (TDM). As described above, the single carrier properties of transmission waveforms of the terminals are maintained by the simultaneous transmission of response signals and uplink data using TDM.

In addition, as illustrated in FIG. 2, the response signals (i.e., "A/N") transmitted from each terminal partially occupy the resources assigned to uplink data (i.e., Physical Uplink Shared CHannel (PUSCH) resources) (i.e., response signals occupy some SC-FDMA symbols adjacent to SC-FDMA symbols to which reference signals (RS) are mapped) and are thereby transmitted to a base station in time-division multiplexing (TDM). However, "subcarriers" in the vertical axis in FIG. 2 are also termed as "virtual subcarriers" or "time contiguous signals," and "time contiguous signals" that are collectively inputted to a discrete Fourier transform (DFT) circuit in a SC-FDMA transmitter are represented as "subcarriers" for convenience. More specifically, optional data of the uplink data is punctured due to the response signals in the PUSCH resources. Accordingly, the quality of uplink data (e.g., coding gain) is significantly reduced due to the punctured bits of the coded uplink data. For this reason, base stations instruct the terminals to use a very low coding rate and/or to use very large transmission power so as to compensate for the reduced quality of the uplink data due to the puncturing.

Meanwhile, the standardization of 3GPP LTE-Advanced for realizing faster communication than 3GPP LTE is in progress. 3GPP LTE-Advanced systems (may be referred to as "LTE-A system," hereinafter) follow LTE systems. 3GPP LTE-Advanced will introduce base stations and terminals capable of communicating with each other using a wideband frequency of 40 MHz or greater to realize a downlink transmission rate of up to 1 Gbps or above.

In the LTE-A system, in order to simultaneously achieve backward compatibility with the LTE system and ultra-high-speed communication several times faster than transmission rates in the LTE system, the LTE-A system band is divided into "component carriers" of 20 MHz or below, which is the bandwidth supported by the LTE system. In other words, the "component carrier" is defined herein as a band having a maximum width of 20 MHz and as the basic unit of communication band. In the Frequency Division Duplex (FDD) system, moreover, "component carrier" in downlink (hereinafter, referred to as "downlink component carrier") is defined as a band obtained by dividing a band according to downlink frequency bandwidth information in a BCH broadcasted from a base station or as a band defined by a distribution width when a downlink control channel (PDCCH) is distributed in the frequency domain. In addition, "component carrier" in uplink (hereinafter, referred to as "uplink component carrier") may be defined as a band obtained by dividing a band according to uplink frequency band information in a BCH broadcasted from a base station or as the basic unit of a communication band of 20 MHz or below including a Physical Uplink Shared CHannel (PUSCH) in the vicinity of the center of the bandwidth and PUCCHs for LTE on both ends of the band. In addition, the term "component carrier" may be also referred to as "cell" in English in 3GPP LTE-Advanced. Furthermore, "component carrier" may also be abbreviated as CC(s).

In the Time Division Duplex (TDD) system, a downlink component carrier and an uplink component carrier have the same frequency band, and downlink communication and uplink communication are realized by switching between the downlink and uplink on a time division basis. For this reason, in the case of the TDD system, the downlink component carrier can also be expressed as "downlink communication timing in a component carrier." The uplink component carrier can also be expressed as "uplink communication timing in a component carrier." The downlink component carrier and the uplink component carrier are switched based on a UL-DL configuration as shown in FIG. 3, in which timings are configured in subframe units (that is, 1 msec units) for downlink communication (DL) and uplink communication (UL) per frame (10 msec). The UL-DL configuration can construct a communication system capable of flexibly meeting a downlink communication throughput requirement and an uplink communication throughput requirement by changing a subframe ratio between downlink communication and uplink communication. For example, FIG. 3 illustrates UL-DL configurations (Config 0 to 6) having different subframe ratios between downlink communication and uplink communication. In addition, in FIG. 3, a downlink communication subframe is represented by "D," an uplink communication subframe is represented by "U" and a special subframe is represented by "S." Here, the special subframe is a subframe at the time of switchover from a downlink communication subframe to an uplink communication subframe. In the special subframe, downlink data communication may be performed as in the case of the downlink communication subframe. In each UL-DL configuration shown in FIG. 3, subframes (20 subframes) corresponding to 2 frames are expressed in two stages: subframes ("D" and "S" in the upper row) used for downlink communication and subframes ("U" in the lower row) used for uplink communication. Furthermore, as shown in FIG. 3, an error detection result corresponding to downlink data (ACK/NACK) is reported in the fourth uplink communication subframe or an uplink communication subframe after the fourth subframe after the subframe to which the downlink data is assigned.

The LTE-A system supports communication using a band obtained by bundling some component carriers, so-called carrier aggregation (CA). Note that while a UL-DL configuration can be set for each component carrier, an LTE-A system compliant terminal (hereinafter, referred to as "LTE-A terminal") is designed assuming that the same UL-DL configuration is set among a plurality of component carriers.

FIGS. 4A and 4B are diagrams provided for describing asymmetric carrier aggregation and a control sequence thereof applicable to individual terminals.

As illustrated in FIG. 4B, a configuration in which carrier aggregation is performed using two downlink component carriers and one uplink component carrier on the left is set for terminal 1, while a configuration in which the two downlink component carriers identical with those used by terminal 1 are used but only uplink component carrier on the right is used for uplink communication is set for terminal 2.

Referring to terminal 1, a base station included in an LTE-A system (that is, LTE-A compliant base station (hereinafter, referred to as "LTE-A base station") and an LTE-A terminal included in the LTE-A system (that is, LTE-A compliant terminal (hereinafter, referred to as "LTE-A terminal") transmit and receive signals to and from each other in accordance with the sequence diagram illustrated in FIG. 4A. As illustrated in FIG. 4A, (1) terminal 1 is synchronized with the downlink component carrier on the left when starting communications with the base station and reads information on the uplink component carrier paired with the downlink component carrier on the left from a broadcast signal called system information block type 2 (SIB2). (2) Using this uplink component carrier, terminal 1 starts communication with the base station by transmitting, for example, a connection request to the base station. (3) Upon determining that a plurality of downlink component carriers need to be assigned to the terminal, the base station instructs the terminal to add a downlink component carrier. However, in this case, the number of uplink component carriers does not increase, and terminal 1, which is an individual terminal, starts asymmetric carrier aggregation.

In addition, in the LTE-A system to which carrier aggregation is applied, a terminal may receive a plurality of downlink data items on a plurality of downlink component carriers at a time. In LTE-A, channel selection (also referred to as "multiplexing"), bundling and a discrete Fourier transform spread orthogonal frequency division multiplexing (DFT-S-OFDM) format are available as a method of transmitting a plurality of response signals for the plurality of downlink data items. In channel selection, a terminal causes not only symbol points used for response signals, but also the resources to which the response signals are mapped to vary in accordance with the pattern for results of the error detection on the plurality of downlink data items. Compared with channel selection, in bundling, the terminal bundles ACK or NACK signals generated according to the results of error detection on the plurality of downlink data items (i.e., by calculating a logical AND of the results of error detection on the plurality of downlink data items, provided that ACK=1 and NACK=0), and response signals are transmitted using one predetermine resource. In transmission using the DFT-S-OFDM format, a terminal jointly encodes (i.e., joint coding) the response signals for the plurality of downlink data items and transmits the coded data using the format (see, NPL 5). For example, a terminal may feed back the response signals (i.e., ACK/NACK) using channel selection, bundling or DFT-S-OFDM according to the number of bits for a pattern for results of error detection. Alternatively, a base station may previously configure the method of transmitting the response signals.

Channel Selection is a technique that varies not only the phase points (i.e., constellation points) for the response signals but also the resources used for transmission of the response signals (may be referred to as "PUCCH resource," hereinafter) on the basis of whether the results of error detection on the plurality of downlink data items for each downlink component carrier received on the plurality of downlink component carriers are each an ACK or NACK as illustrated in FIG. 5. Meanwhile, bundling is a technique that bundles ACK/NACK signals for the plurality of downlink data items into a single set of signals and thereby transmits the bundled signals using one predetermined resource (see, NPL 6 and 7).

Hereinafter, the set of the signals formed by bundling ACK/NACK signals for a plurality of downlink data items into a single set of signals may be referred to as "bundled ACK/NACK signals."

The following two methods are considered as a possible method of transmitting response signals in uplink when a terminal receives downlink assignment control information via a PDCCH and receives downlink data.

One of the methods is to transmit response signals using a PUCCH resource associated in a one-to-one correspondence with a control channel element (CCE) occupied by the PDCCH (i.e., implicit signaling) (hereinafter, method 1). More specifically, when DCI intended for a terminal served by a base station is mapped in a PDCCH region, each PDCCH occupies a resource consisting of one or a plurality of contiguous CCEs. In addition, as the number of CCEs occupied by a PDCCH (i.e., the number of aggregated CCEs: CCE aggregation level), one of aggregation levels 1, 2, 4 and 8 is selected according to the number of information bits of the assignment control information or a propagation path condition of the terminal, for example.

The other method is to previously indicate a PUCCH resource to each terminal from a base station (i.e., explicit signaling) (hereinafter, method 2). To put it differently, each terminal transmits response signals using the PUCCH resource previously indicated by the base station in method 2.

Furthermore, as shown in FIG. 5, the terminal transmits response signals using one of two component carriers. A component carrier that transmits such response signals is called "primary component carrier (PCC) or primary cell (PCell)." The other component carrier is called "secondary component carrier (SCC) or secondary cell (SCell)." For example, the PCC (PCell) is a component carrier that transmits broadcast information on a component carrier that transmits response signals (e.g., system information block type 2 (SIB2)).

In method 2, PUCCH resources common to a plurality of terminals (e.g., four PUCCH resources) may be previously indicated to the terminals from a base station. For example, terminals may employ a method to select one PUCCH resource to be actually used, on the basis of a transmit power control (TPC) command of two bits included in DCI in SCell. In this case, the TPC command is also called an ACK/NACK resource indicator (ARI). Such a TPC command allows a certain terminal to use an explicitly signaled PUCCH resource in a certain subframe while allowing another terminal to use the same explicitly signaled PUCCH resource in another subframe in the case of explicit signaling.

Meanwhile, in channel selection, a PUCCH resource in an uplink component carrier associated in a one-to-one correspondence with the top CCE index of the CCEs occupied by the PDCCH indicating the PDSCH in PCC (PCell) (i.e., PUCCH resource in PUCCH region 1 in FIG. 5) is assigned (implicit signaling).

Here, ARQ control using channel selection when the above asymmetric carrier aggregation is applied to a terminal will be described with reference to FIG. 5 and FIGS. 6A and 6B.

For example, in FIG. 5, a component carrier group (may be referred to as "component carrier set" in English) consisting of component carrier 1 (PCell) and component carrier 2 (SCell) is set for terminal 1. In this case, after downlink resource assignment information is transmitted to terminal 1 from the base station via a PDCCH of each of component carriers 1 and 2, downlink data is transmitted using the resource corresponding to the downlink resource assignment information.

Furthermore, in channel selection, response signals representing error detection results corresponding to a plurality of downlink data items in component carrier 1 (PCell) and error detection results corresponding to a plurality of downlink data items in component carrier 2 (SCell) are mapped to PUCCH resources included in PUCCH region 1 or PUCCH region 2. The terminal uses two types of phase points (Binary Phase Shift Keying (BPSK) mapping) or four types of phase points (Quadrature Phase Shift Keying (QPSK) mapping) as response signals thereof. That is, in channel selection, it is possible to express a pattern for results of error detection corresponding to a plurality of downlink data items in component carrier 1 (PCell) and the results of error detection corresponding to a plurality of downlink data items in component carrier 2 (SCell) by a combination of PUCCH resources and phase points.

Here, FIG. 6A shows a method of mapping a pattern for results of error detection when the number of component carriers is two (one PCell, one SCell) in a TDD system.

Note that FIG. 6A assumes a case where the transmission mode is set to one of (a), (b) and (c) below.

(a) A transmission mode in which each component carrier supports only one-CW transmission in downlink (b) A transmission mode in which one component carrier supports only one-CW transmission in downlink and the other component carrier supports up to two-CW transmission in downlink (c) A transmission mode in which each component carrier supports up to two-CW transmission in downlink Furthermore, FIG. 6A assumes a case where number M is set in one of (1) to (4) below, M indicating how many downlink communication subframes per component carrier (hereinafter, described as "DL (DownLink) subframes," "D" or "S" shown in FIG. 3) of results of error detection need to be reported to the base station using one uplink communication subframe (hereinafter, described as "UL (UpLink) subframe," "U" shown in FIG. 3). For example, in Config 2 shown in FIG. 3, since results of error detection of four DL subframes are reported to the base station using one UL subframe, M=4.

(1) M=1
(2) M=2
(3) M=3
(4) M=4

That is, FIG. 6A illustrates a method of mapping a pattern for results of error detection when (a) to (c) above are combined with (1) to (4) above. The value of M varies depending on UL-DL configuration (Config 0 to 6) and subframe number (SF#0 to SF#9) in one frame as shown in FIG. 3. Furthermore, in Config 5 shown in FIG. 3, M=9 in subframe (SF) #2. However, in this case, in the LTE-A TDD system, the terminal does not apply channel selection and reports the results of error detection using, for example, a DFT-S-OFDM format. For this reason, in FIG. 6A, Config 5 (M=9) is not included in the combination.

In the case of (1), the number of error detection result patterns is $2^2 \times 1 = 4$ patterns, $2^3 \times 1 = 8$ patterns and $2^4 \times 1 = 16$ patterns in order of (a), (b) and (c). In the case of (2), the number of error detection result patterns is $2^2 \times 2 = 8$ patterns, $2^3 \times 2 = 16$ patterns, $2^4 \times 2 = 32$ patterns in order of (a), (b) and (c). The same applies to (3) and (4).

Here, it is assumed that the phase difference between phase points to be mapped in one PUCCH resource is 90 degrees at minimum (that is, a case where a maximum of 4 patterns per PUCCH resource are mapped). In this case, the number of PUCCH resources necessary to map all error detection result patterns is $2^4 \times 4 \div 4 = 16$ in (4) and (c) when the number of error detection result patterns is a maximum ($2^4 \times 4 = 64$ patterns), which is not realistic. Thus, the TDD system intentionally reduces the amount of information on the results of error detection by bundling the results of error detection in a spatial region or further in a time domain if necessary. In this way, the TDD system limits the number of PUCCH resources necessary to report the error detection result patterns.

In the LTE-A TDD system, in the case of (1), the terminal maps 4 patterns, 8 patterns and 16 patterns of results of error detection in order of (a), (b) and (c) to 2, 3 and 4 PUCCH resources respectively without bundling the results of error detection (Step3 in FIG. 6A). That is, the terminal reports an error detection result using 1 bit per component carrier in which a transmission mode (non-MIMO) supporting only one-codeword (CW) transmission in downlink and reports error detection results using 2 bits per component carrier in which a transmission mode (MIMO) supporting up to two-CW transmissions in downlink.

In the LTE-A TDD system, in the cases of (2) and (a), the terminal maps eight patterns of results of error detection to four PUCCH resources without bundling the results of error detection (Step3 in FIG. 6A). In that case, the terminal reports error detection results using 2 bits per downlink component carrier.

In the LTE-A TDD system, in the cases of (2) and (b) (the same applies to (2) and (c)), the terminal bundles the results of error detection of component carriers in which a transmission mode supporting up to two-CW transmission in downlink is set in a spatial region (spatial bundling) (Step1 in FIG. 6A). In the spatial bundling, when the result of error detection corresponding to at least one CW of two CWs of the results of error detection is NACK, the terminal determines the results of error detection after the spatial bundling to be NACK. That is, in spatial bundling, Logical And of the results of error detection of two CWs is taken. The terminal then maps error detection result patterns after spatial bundling (8 patterns in the cases of (2) and (b), 16 patterns in the cases of (2) and (c)) to four PUCCH resources (Step3 in FIG. 6A). In that case, the terminal reports error detection results using 2 bits per downlink component carrier.

In the LTE-A TDD system, in the cases of (3) or (4), and (a), (b) or (c), the terminal performs bundling in the time domain (time-domain bundling) after the spatial bundling (Step1) (Step2 in FIG. 6A). The terminal then maps the error detection result patterns after the time-domain bundling to four PUCCH resources (Step3 in FIG. 6A). In that case, the terminal reports results of error detection using 2 bits per downlink component carrier.

Next, an example of more specific mapping methods will be described with reference to FIG. 6B. FIG. 6B shows an example of a case where the number of downlink component carriers is 2 (one PCell, one SCell) and a case where "(c) a transmission mode in which each component carrier supports up to two-CW transmission in the downlink" is set and a case with "(4) M=4."

In FIG. 6B, the results of error detection of a PCell are (ACK (A), ACK), (ACK, ACK), (NACK (N), NACK) and (ACK, ACK) in order of (CW0, CW1) in four DL subframes (SF1 to 4). In the PCell shown in FIG. 6B, M=4, and therefore the terminal spatially bundles these subframes in Step1 in FIG. 6A (portions enclosed by a solid line in FIG. 6B). As a result of the spatial bundling, ACK, ACK, NACK and ACK are obtained in that order in four DL subframes of the PCell shown in FIG. 6B. Furthermore, in Step2 in FIG. 6A, the terminal applies time-domain bundling to the 4-bit error detection result pattern (ACK, ACK, NACK, ACK) after spatial bundling obtained in Step1 (portions enclosed by broken line in FIG. 6B). In this way, a 2-bit error detection result of (NACK, ACK) is obtained in the PCell shown in FIG. 6B.

The terminal likewise applies spatial bundling and time-domain bundling also for the SCell shown in FIG. 6B and thereby obtains a 2-bit error detection result (NACK, NACK).

The terminal then combines the error detection result patterns using 2 bits each after time-domain bundling of the PCell and SCell in Step3 in FIG. 6A in order of the PCell, SCell to bundle them into a 4-bit error detection result pattern (NACK, ACK, NACK, NACK). The terminal determines a PUCCH resource (in this case, h1) and a phase point (in this case, −j) using the mapping table shown in Step3 in FIG. 6A from this 4-bit error detection result pattern.

FIG. 7 illustrates the value of M in each component carrier, the bundling method and the number of bits for reporting an error detection result when the UL-DL configuration is the same between component carriers (CC#1, CC#2). When M=1, the number of bits of an error detection result to be mapped per component carrier varies depending on a transmission mode (MIMO) in which each component carrier supports up to two-CW transmission or a transmission mode (non-MIMO) in which each component carrier supports only one-CW transmission (two bits in the former and one bit in the latter). Thus, FIG. 7 describes the former as "M=1 (MIMO)" and the latter as "M=1 (non-MIMO)" to make a distinction between the two. In M=2 to 4 shown in FIG. 7, the number of bits of the error detection result to be mapped per component carrier is two regardless of the transmission mode of each component carrier. Moreover, since the UL-DL configuration is the same between component carriers, the value of M also becomes the same between the component carriers. For this reason, there are only combinations in the diagonal direction (the value of M is the same between CC#1 and CC#2) in FIG. 7.

CITATION LIST

Non-Patent Literature

NPL 1
3GPP TS 36.211 V10.1.0, "Physical Channels and Modulation (Release 9)," March 2011
NPL 2
3GPP TS 36.212 V10.1.0, "Multiplexing and channel coding (Release 9)," March 2011
NPL 3
3GPP TS 36.213 V10.1.0, "Physical layer procedures (Release 9)," March 2011
NPL 4
Seigo Nakao, Tomofumi Takata, Daichi Imamura, and Katsuhiko Hiramatsu, "Performance enhancement of E-UTRA uplink control channel in fast fading environments," Proceeding of IEEE VTC 2009 spring, April. 2009
NPL 5
Ericsson and ST-Ericsson, "A/N transmission in the uplink for carrier aggregation," R1-100909, 3GPP TSG-RAN WG1 #60, February 2010
NPL 6
ZTE, 3GPP RAN1 meeting #57, R1-091702, "Uplink Control Channel Design for LTE-Advanced," May 2009
NPL 7
Panasonic, 3GPP RAN1 meeting #57, R1-091744, "UL ACK/NACK transmission on PUCCH for Carrier aggregation," May 2009

SUMMARY OF INVENTION

Technical Problem

As described above, LTE-A terminals are designed on the assumption that the same UL-DL configuration is set among a plurality of component carriers.

Incidentally, studies are being carried out, for a case where a communication carrier providing an LTE-A TDD system newly assigns a frequency band to an LTE-A service, on a possibility of varying a UL-DL configuration of the newly assigned frequency band from a UL-DL configuration of an existing frequency band depending on a service to which the communication carrier attaches greater importance. To be more specific, a communication carrier that attaches greater importance to downlink communication throughput uses a UL-DL configuration having a greater ratio of DL subframes to UL subframes in a new frequency band (e.g., Config 3, 4 or 5 or the like in FIG. 3). This allows a more flexible system to be constructed.

However, no studies have been carried out so far on a method of bundling results of error detection when a UL-DL configuration varies between component carriers, that is, when the value of "M" varies from one component carrier to another.

An object of the present invention is to provide a terminal apparatus and a response signal transmission method capable of correctly transmitting and receiving results of error detection by bundling a plurality of results of error detection when ARQ is applied in communication using an uplink component carrier and a plurality of downlink component carriers associated with the uplink component carrier and when a UL-DL configuration (a ratio between UL subframes and DL subframes) set for each component carrier varies.

Solution to Problem

A terminal apparatus according to an aspect of the present invention is a terminal apparatus configured to communicate with a base station apparatus using a first component carrier and a second component carrier and to report, to the base station apparatus, a response signal generated by performing bundling including spatial bundling and time-domain bundling on results of error detection of downlink data items, the terminal apparatus including: a receiving section that receives the downlink data items using the first component carrier and the second component carrier, respectively; an error detection section that detects an error in each of the downlink data items; and a generating section that generates the response signal by performing bundling on the results of error detection based on a ratio of a number of bits of results of error detection between the first component carrier and the second component carrier so that a total number of bits of results of error detection of the downlink data items obtained in the error detection section becomes a number of bits for reporting the response signal.

A response signal generating method used in a terminal apparatus configured to communicate with a base station apparatus using a first component carrier and a second component carrier and to report, to the base station apparatus, a response signal generated by performing bundling including spatial bundling and time-domain bundling on results of error detection of downlink data, the method including: receiving downlink data items using the first component carrier and the second component carrier, respectively; detecting an error in each of the downlink data items; and generating the response signal by performing bundling on the results of error detection based on a ratio of the number of bits of results of error detection between the first component carrier and the second component carrier so that a total number of bits of results of error detection of the downlink data items obtained in the error detection section becomes a number of bits for reporting the response signal.

Advantageous Effects of Invention

According to the present invention, it is possible to correctly transmit and receive a plurality of results of error detection by bundling the plurality of results of error detection when ARQ is applied in communication using an uplink component carrier and a plurality of downlink component carriers associated with the uplink component carrier, and when a UL-DL configuration (ratio between UL subframes and DL subframes) set for each component carrier varies.

BRIEF DESCRIPTION OF DRAWINGS

FIGS. 6A and 6B are diagrams provided for describing a bundling method and a mapping method in TDD;

FIG. 12 is a diagram provided for describing spatial bundling according to Embodiment 1 of the present invention;

FIG. 13 is a diagram provided for describing time-domain bundling according to Embodiment 1 of the present invention;

FIG. 14 is a diagram provided for describing time-domain bundling according to Embodiment 1 of the present invention;

FIG. 16 is a diagram provided for describing bundling according to Embodiment 2 of the present invention;

FIG. 18 is a diagram provided for describing bundling according to Embodiment 3 of the present invention;

FIG. 20 is a diagram provided for describing bundling according to Embodiment 4 of the present invention;

FIG. 21 is a diagram provided for describing bundling according to Embodiment 5 of the present invention;

DESCRIPTION OF EMBODIMENTS

Figure 1:
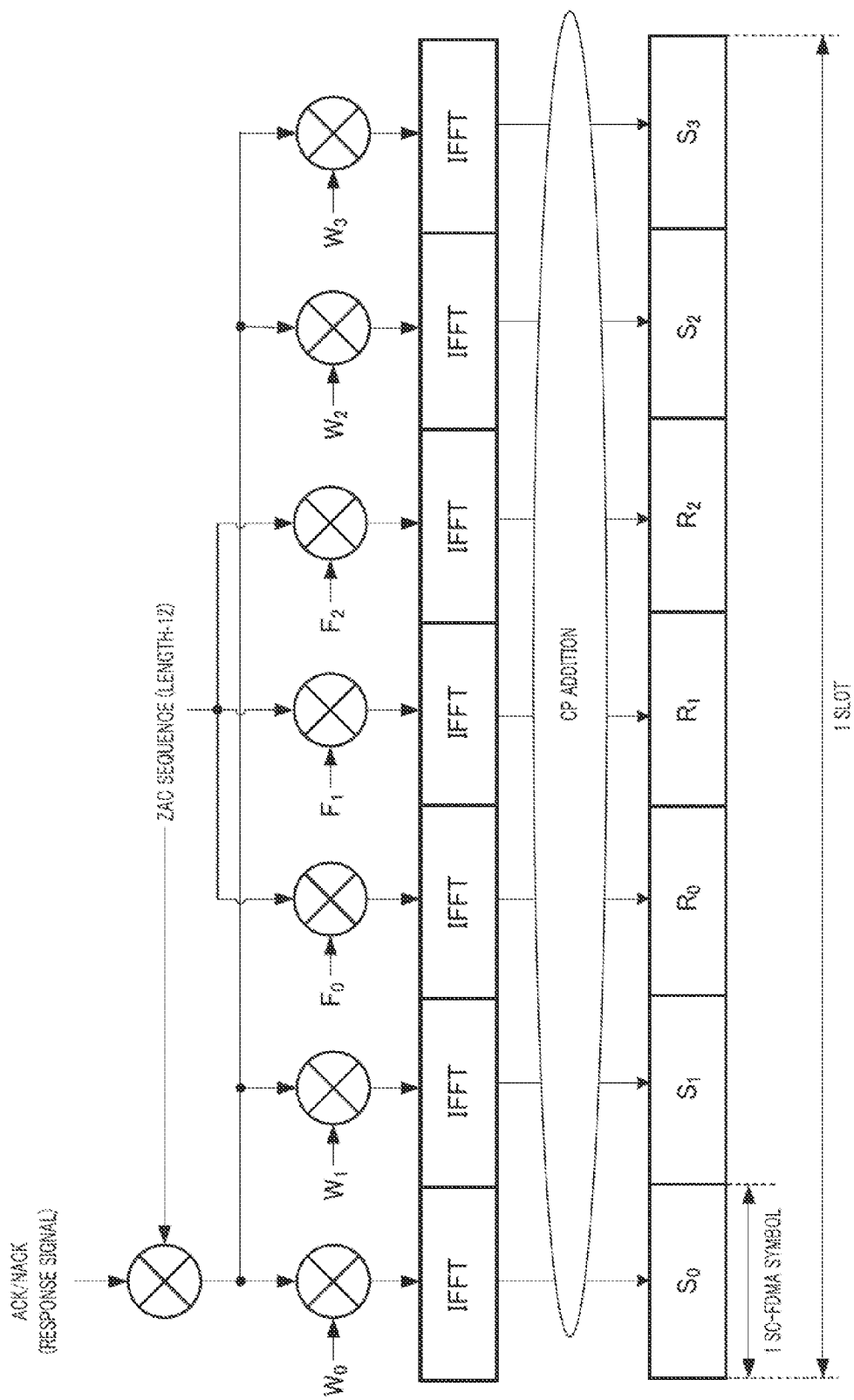
FIG. 1 is a diagram illustrating a method of spreading response signals and reference signals.
Figure 2:
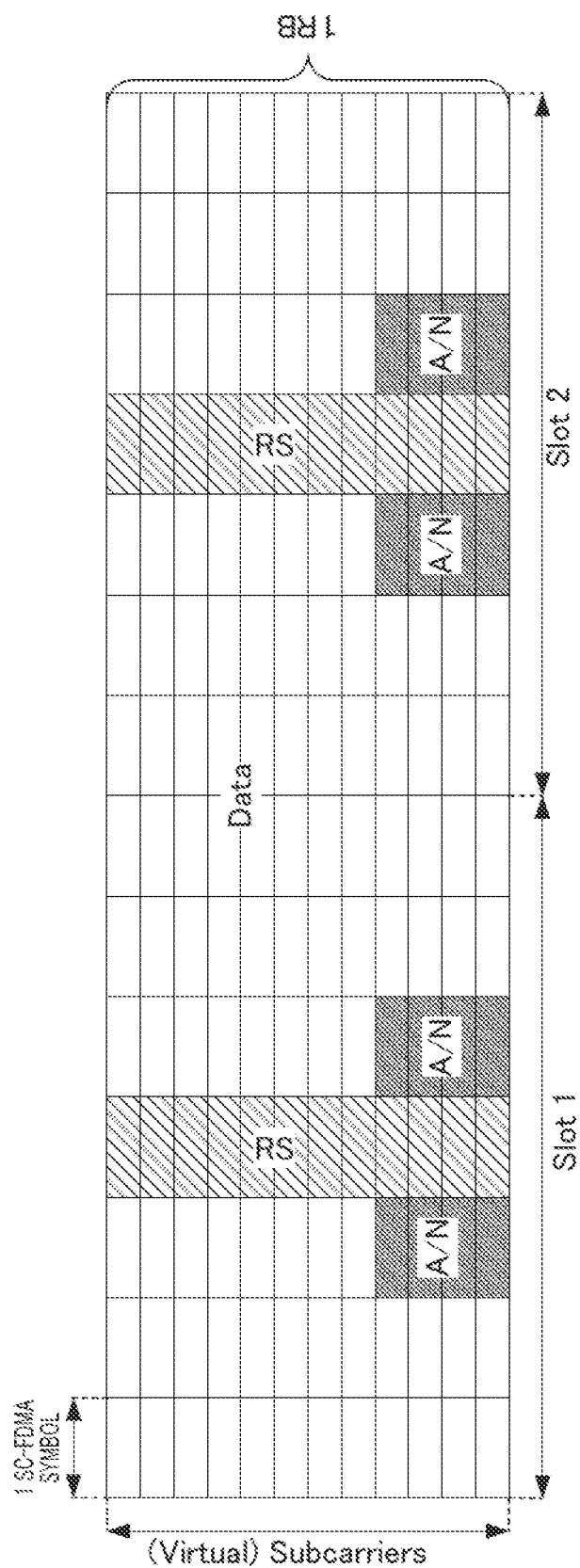
FIG. 2 is a diagram illustrating an operation related to a case where TDM is applied to response signals and uplink data on PUSCH resources.

Hereinafter, embodiments of the present invention will be described in detail with reference to the accompanying drawings. Throughout the embodiments, the same components are assigned the same reference numerals and any duplicate description of the components is omitted.

(Embodiment 1)

Figure 8:
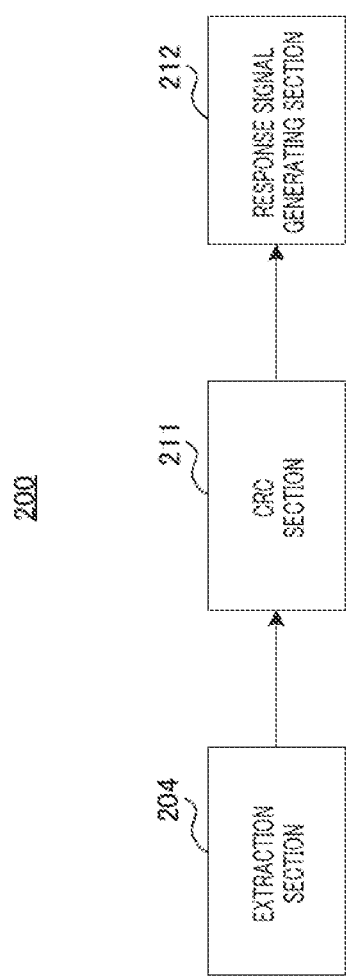
FIG. 8 is a block diagram illustrating a main configuration of a terminal according to Embodiment 1 of the present invention.

FIG. 8 is a main configuration diagram of terminal 200 according to the present embodiment. Terminal 200 communicates with base station 100 using a plurality of component carriers including a first component carrier and a second component carrier, performs bundling including spatial bundling and time-domain bundling on results of error detection corresponding to downlink data and reports the bundling results to base station 100. In terminal 200, extraction section 204 extracts downlink data using the first component carrier and the second component carrier. Thus, terminal 200 receives the downlink data. CRC section 211 detects an error in each downlink data item, and response signal generating section 212 performs bundling on the results of error detection to generate a response signal based on a ratio of the number of bits of results of error detection between the first component carrier and the second component carrier so that the total number of bits of the results of error detection of downlink data items obtained in CRC section 211 becomes the number of bits for reporting the response signal.

(Configuration of Base Station)

Figure 9:
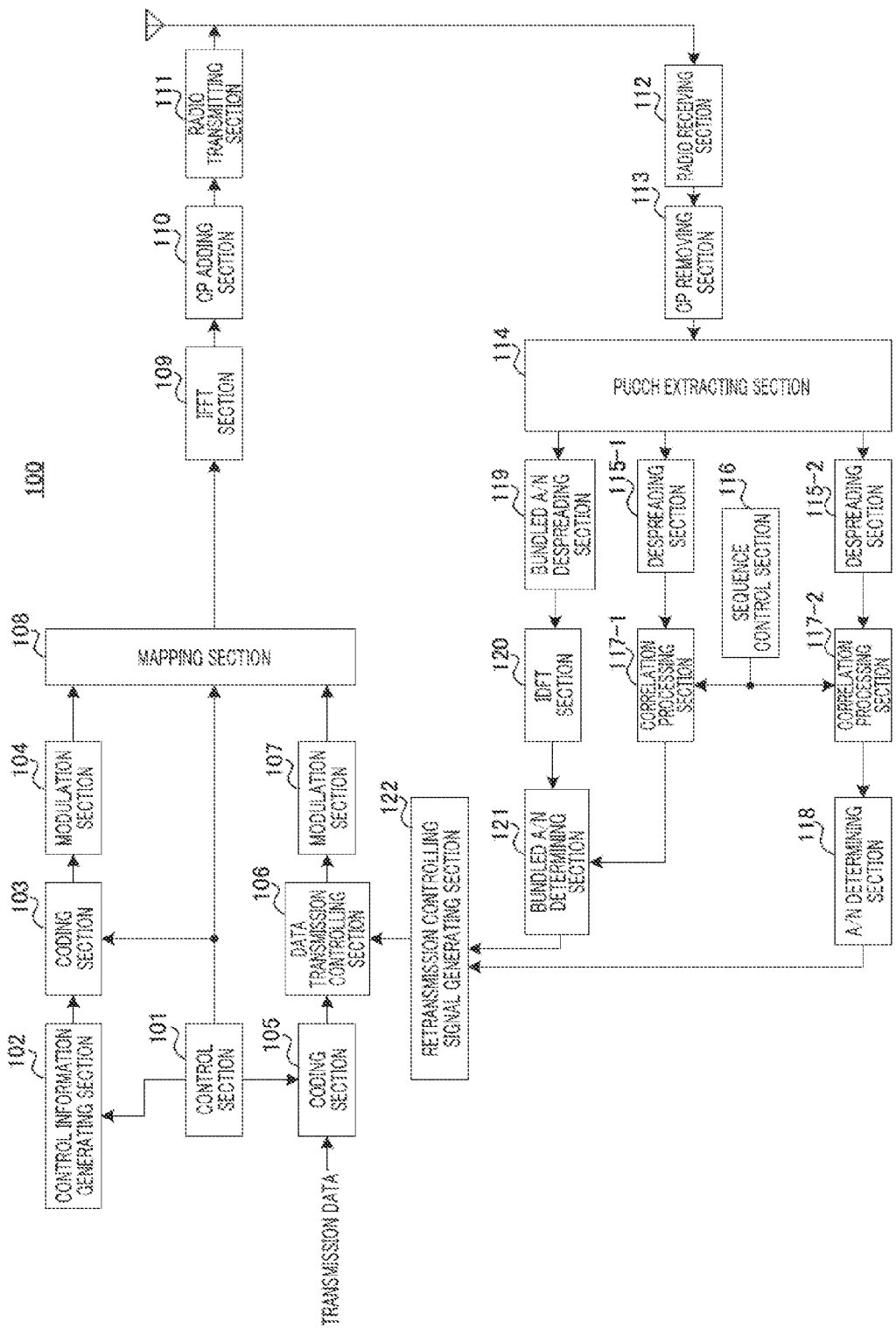
FIG. 9 is a block diagram illustrating a configuration of a base station according to Embodiment 1 of the present invention.

FIG. 9 is a configuration diagram of base station 100 according to Embodiment 1 of the present invention. In FIG. 9, base station 100 includes control section 101, control information generating section 102, coding section 103, modulation section 104, coding section 105, data transmission controlling section 106, modulation section 107, mapping section 108, inverse fast Fourier transform (IFFT) section 109, CP adding section 110, radio transmitting section 111, radio receiving section 112, CP removing section 113, PUCCH extracting section 114, despreading section 115, sequence controlling section 116, correlation processing section 117, A/N determining section 118, bundled A/N despreading section 119, inverse discrete Fourier transform (IDFT) section 120, bundled A/N determining section 121 and retransmission control signal generating section 122.

Control section 101 assigns a downlink resource for transmitting control information (i.e., downlink control information assignment resource) and a downlink resource for transmitting downlink data (i.e., downlink data assignment resource) for a resource assignment target terminal (hereinafter, referred to as "destination terminal" or simply "terminal") 200. This resource assignment is performed in a downlink component carrier included in a component carrier group configured for resource assignment target terminal 200. In addition, the downlink control information assignment resource is selected from among the resources corresponding to downlink control channel (i.e., PDCCH) in each downlink component carrier. Moreover, the downlink data assignment resource is selected from among the resources corresponding to downlink data channel (i.e., PDSCH) in each downlink component carrier. In addition, when there are a plurality of resource assignment target terminals 200, control section 101 assigns different resources to resource assignment target terminals 200, respectively.

The downlink control information assignment resources are equivalent to L1/L2 CCH described above. To put it more specifically, the downlink control information assignment resources are each formed of one or a plurality of CCEs.

Control section 101 determines the coding rate used for transmitting control information to resource assignment target terminal 200. The data size of the control information varies depending on the coding rate. Thus, control section 101 assigns a downlink control information assignment resource having the number of CCEs that allows the control information having this data size to be mapped to the resource.

Control section 101 outputs information on the downlink data assignment resource to control information generating section 102. Moreover, control section 101 outputs information on the coding rate to coding section 103. In addition, control section 101 determines and outputs the coding rate of transmission data (i.e., downlink data) to coding section 105. Moreover, control section 101 outputs information on the downlink data assignment resource and downlink control information assignment resource to mapping section 108. However, control section 101 controls the assignment in such a way that the downlink data and downlink control information for the downlink data are mapped to the same downlink component carrier.

Control information generating section 102 generates and outputs control information including the information on the downlink data assignment resource to coding section 103. This control information is generated for each downlink component carrier. In addition, when there are a plurality of resource assignment target terminals 200, the control information includes the terminal ID of each destination terminal 200 in order to distinguish resource assignment target terminals 200 from one another. For example, the control information includes CRC bits masked by the terminal ID of destination terminal 200. This control information may be referred to as "control information carrying downlink assignment" or "downlink control information (DCI)."

Coding section 103 encodes the control information using the coding rate received from control section 101 and outputs the coded control information to modulation section 104.

Modulation section 104 modulates the coded control information and outputs the resultant modulation signals to mapping section 108.

Coding section 105 uses the transmission data (i.e., downlink data) for each destination terminal 200 and the coding rate information from control section 101 as input and encodes and outputs the transmission data to data transmission controlling section 106. However, when a plurality of downlink component carriers are assigned to destination terminal 200, coding section 105 encodes each transmission data to item be transmitted on a corresponding one of the downlink component carriers and transmits the coded transmission data items to data transmission controlling section 106.

Data transmission controlling section 106 outputs the coded transmission data to modulation section 107 and also keeps the coded transmission data at the initial transmission. In addition, data transmission controlling section 106 keeps the transmission data for one destination terminal 200 for each downlink component carrier on which the transmission data is transmitted. Thus, it is possible to perform not only retransmission control for overall data transmitted to destination terminal 200, but also retransmission control for data on each downlink component carrier.

Furthermore, upon reception of a NACK or DTX for downlink data transmitted on a certain downlink component carrier from retransmission control signal generating section 122, data transmission controlling section 106 outputs the data kept in the manner described above and corresponding to this downlink component carrier to modulation section 107. Upon reception of an ACK for the downlink data transmitted on a certain downlink component carrier from retransmission control signal generating section 122, data transmission controlling section 106 deletes the data kept in the manner described above and corresponding to this downlink component carrier.

Modulation section 107 modulates the coded transmission data received from data transmission controlling section 106 and outputs the resultant modulation signals to mapping section 108.

Mapping section 108 maps the modulation signals of the control information received from modulation section 104 to the resource indicated by the downlink control information assignment resource received from control section 101 and outputs the resultant modulation signals to IFFT section 109.

Mapping section 108 maps the modulation signals of the transmission data received from modulation section 107 to the resource (i.e., PDSCH (i.e., downlink data channel)) indicated by the downlink data assignment resource received from control section 101 (i.e., information included in the control information) and outputs the resultant modulation signals to IFFT section 109.

The control information and transmission data mapped to a plurality of subcarriers in a plurality of downlink component carriers in mapping section 108 is transformed into time-domain signals from frequency-domain signals in IFFT section 109, and CP adding section 110 adds a CP to the time-domain signals to form OFDM signals. The OFDM signals undergo transmission processing such as digital to analog (D/A) conversion, amplification and up-conversion and/or the like in radio transmitting section 111 and are transmitted to terminal 200 via an antenna.

Radio receiving section 112 receives, via an antenna, the uplink response signals or reference signals transmitted from terminal 200, and performs reception processing such as down-conversion, A/D conversion and/or the like on the uplink response signals or reference signals.

CP removing section 113 removes the CP added to the uplink response signals or reference signals from the uplink response signals or reference signals that have undergone the reception processing.

PUCCH extracting section 114 extracts, from the PUCCH signals included in the received signals, the signals in the PUCCH region corresponding to the bundled ACK/NACK resource previously indicated to terminal 200. The bundled ACK/NACK resource herein refers to a resource used for transmission of the bundled ACK/NACK signals and adopting the DFT-S-OFDM format structure. To put it more specifically, PUCCH extracting section 114 extracts the data part of the PUCCH region corresponding to the bundled ACK/NACK resource (i.e., SC-FDMA symbols on which the bundled ACK/NACK resource is assigned) and the reference signal part of the PUCCH region (i.e., SC-FDMA symbols on which the reference signals for demodulating the bundled ACK/NACK signals are assigned). PUCCH extracting section 114 outputs the extracted data part to bundled A/N despreading section 119 and outputs the reference signal part to despreading section 115-1.

In addition, PUCCH extracting section 114 extracts, from the PUCCH signals included in the received signals, a plurality of PUCCH regions corresponding to an A/N resource associated with a CCE that has been occupied by the PDCCH used for transmission of the downlink assignment control information (DCI), and corresponding to a plurality of A/N resources previously indicated to terminal 200. The A/N resource herein refers to the resource to be used for transmission of an A/N. To put it more specifically, PUCCH extracting section 114 extracts the data part of the PUCCH region corresponding to the A/N resource (i.e., SC-FDMA symbols on which the uplink control signals are assigned) and the reference signal part of the PUCCH region (i.e., SC-FDMA symbols on which the reference signals for demodulating the uplink control signals are assigned). PUCCH extracting section 114 outputs both of the extracted data part and reference signal part to despreading section 115-2. In this manner, the response signals are received on the resource selected from the PUCCH resource associated with the CCE and the specific PUCCH resource previously indicated to terminal 200.

Sequence controlling section 116 generates a base sequence that may be used for spreading each of the A/N reported from terminal 200, the reference signals for the A/N, and the reference signals for the bundled ACK/NACK signals (i.e., length-12 ZAC sequence). In addition, sequence controlling section 116 identifies a correlation window corresponding to a resource on which the reference signals may be assigned (hereinafter, referred to as "reference signal resource") in PUCCH resources that may be used by terminal 200. Sequence control section 116 outputs the information indicating the correlation window corresponding to the reference signal resource on which the reference signals may be assigned in bundled ACK/NACK resources and the base sequence to correlation processing section 117-1. Sequence controlling section 116 outputs the information indicating the correlation window corresponding to the reference signal resource and the base sequence to correlation processing section 117-1. In addition, sequence controlling section 116 outputs the information indicating the correlation window corresponding to the A/N resources on which an A/N and the reference signals for the A/N are assigned and the base sequence to correlation processing section 117-2.

Despreading section 115-1 and correlation processing section 117-1 perform processing on the reference signals extracted from the PUCCH region corresponding to the bundled ACK/NACK resource.

More specifically, despreading section 115-1 despreads the reference signal part using a Walsh sequence to be used in secondary-spreading for the reference signals of the bundled ACK/NACK resource by terminal 200 and outputs the despread signals to correlation processing section 117-1.

Correlation processing section 117-1 uses the information indicating the correlation window corresponding to the reference signal resource and the base sequence and thereby finds a correlation value between the signals received from despreading section 115-1 and the base sequence that may be used in primary-spreading in terminal 200. Correlation processing section 117-1 outputs the correlation value to bundled A/N determining section 121.

Despreading section 115-2 and correlation processing section 117-2 perform processing on the reference signals and A/Ns extracted from the plurality of PUCCH regions corresponding to the plurality of A/N resources.

More specifically, despreading section 115-2 despreads the data part and reference signal part using a Walsh sequence and a DFT sequence to be used in secondary-spreading for the data part and reference signal part of each of the A/N resources by terminal 200, and outputs the despread signals to correlation processing section 117-2.

Correlation processing section 117-2 uses the information indicating the correlation window corresponding to each of the A/N resources and the base sequence and thereby finds a correlation value between the signals received from despreading section 115-2 and a base sequence that may be used in primary-spreading by terminal 200. Correlation processing section 117-2 outputs each correlation value to A/N determining section 118.

A/N determining section 118 determines, on the basis of the plurality of correlation values received from correlation processing section 117-2, which of the A/N resources is used to transmit the signals from terminal 200 or none of the A/N resources is used. When determining that the signals are transmitted using one of the A/N resources from terminal 200, A/N determining section 118 performs coherent detection using a component corresponding to the reference signals and a component corresponding to the A/N and outputs the result of coherent detection to retransmission control signal generating section 122. Meanwhile, when determining that terminal 200 uses none of the A/N resources, A/N determining section 118 outputs the determination result indicating that none of the A/N resources is used to retransmission control signal generating section 122. Details of the bundling method in terminal 200 to allow A/N determining section 118 to correctly determine a plurality of transmitted A/Ns will be described later.

Bundled A/N despreading section 119 despreads, using a DFT sequence, the bundled ACK/NACK signals corresponding to the data part of the bundled ACK/NACK resource received from PUCCH extracting section 114 and outputs the despread signals to IDFT section 120.

IDFT section 120 transforms the bundled ACK/NACK signals in the frequency-domain received from bundled A/N despreading section 119 into time-domain signals by IDFT processing and outputs the bundled ACK/NACK signals in the time-domain to bundled A/N determining section 121.

Bundled A/N determining section 121 demodulates the bundled ACK/NACK signals corresponding to the data part of the bundled ACK/NACK resource received from IDFT section 120, using the reference signal information on the bundled ACK/NACK signals that is received from correlation processing section 117-1. In addition, bundled A/N determination section 121 decodes the demodulated bundled ACK/NACK signals and outputs the result of decoding to retransmission control signal generating section 122 as the bundled A/N information. However, when the correlation value received from correlation processing section 117-1 is smaller than a threshold, and bundled A/N determining section 121 thus determines that terminal 200 does not use any bundled A/N resource to transmit the signals, bundled A/N determining section 121 outputs the result of determination to retransmission control signal generating section 122.

Retransmission control signal generating section 122 determines whether or not to retransmit the data transmitted on the downlink component carrier (i.e., downlink data) on the basis of the information inputted from bundled A/N determining section 121 and the information inputted from A/N determining section 118 and generates retransmission control signals based on the result of determination. More specifically, when determining that downlink data transmitted on a certain downlink component carrier needs to be retransmitted, retransmission control signal generating section 122 generates retransmission control signals indicating a retransmission command for the downlink data and outputs the retransmission control signals to data transmission controlling section 106. In addition, when determining that the downlink data transmitted on a certain downlink component carrier does not need to be retransmitted, retransmission control signal generating section 122 generates retransmission control signals indicating not to retransmit the downlink data transmitted on the downlink component carrier and outputs the retransmission control signals to data transmission controlling section 106.

(Configuration of Terminal)

Figure 10:
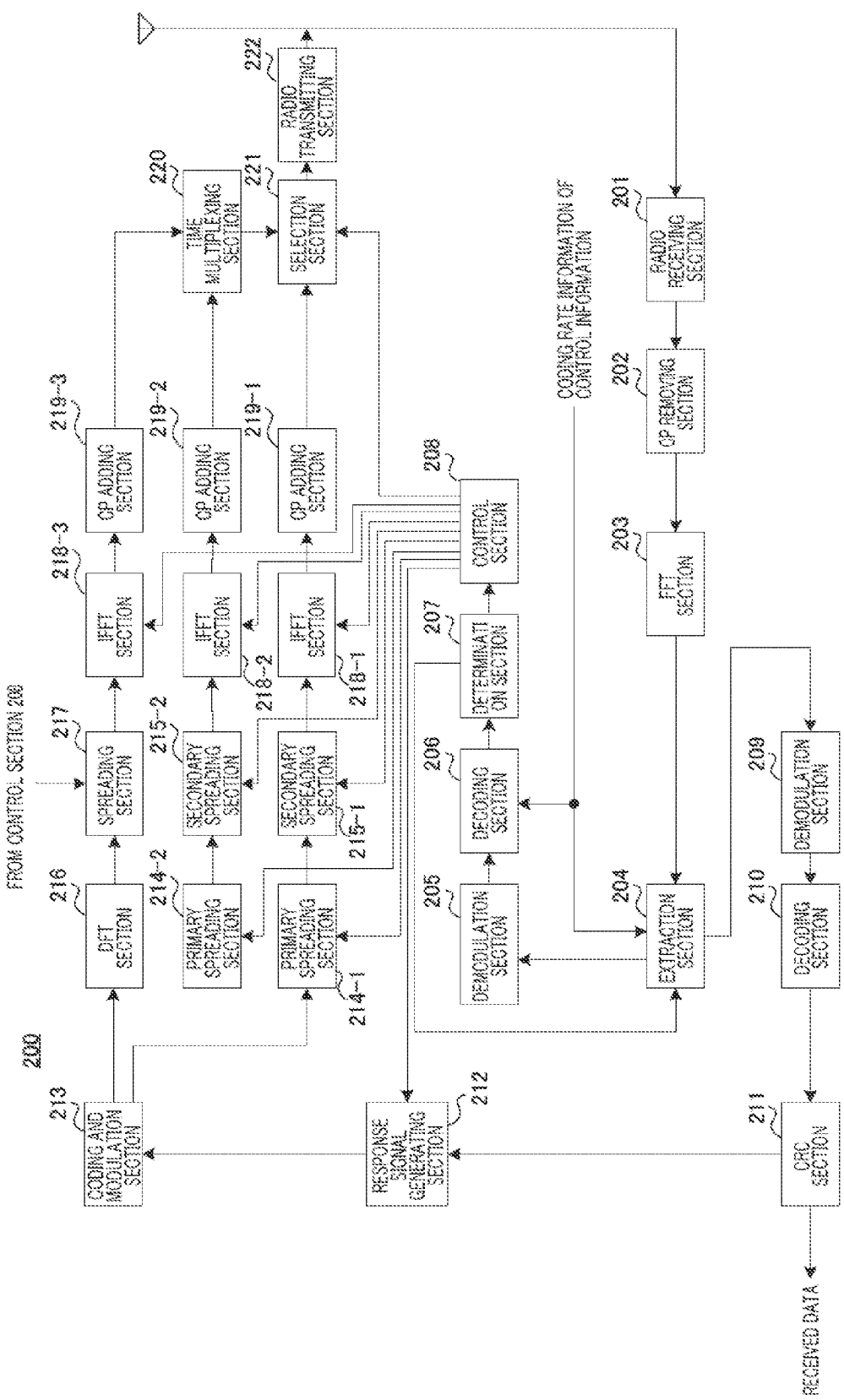
FIG. 10 is a block diagram illustrating a configuration of a terminal according to Embodiment 1 of the present invention.

FIG. 10 is a block diagram illustrating a configuration of terminal 200 according to Embodiment 1. In FIG. 10, terminal 200 includes radio receiving section 201, CP removing section 202, fast Fourier transform (FFT) section 203, extraction section 204, demodulation section 205, decoding section 206, determination section 207, control section 208, demodulation section 209, decoding section 210, CRC section 211, response signal generating section 212, coding and modulation section 213, primary-spreading sections 214-1 and 214-2, secondary-spreading sections 215-1 and 215-2, DFT section 216, spreading section 217, IFFT sections 218-1, 218-2 and 218-3, CP adding sections 219-1, 219-2 and 219-3, time-multiplexing section 220, selection section 221 and radio transmitting section 222.

Radio receiving section 201 receives, via an antenna, OFDM signals transmitted from base station 100 and performs reception processing such as down-conversion, A/D conversion and/or the like on the received OFDM signals. It should be noted that, the received OFDM signals include PDSCH signals assigned to a resource in a PDSCH (i.e., downlink data), or PDCCH signals assigned to a resource in a PDCCH.

CP removing section 202 removes a CP that has been added to the OFDM signals from the OFDM signals that have undergone the reception processing.

FFT section 203 transforms the received OFDM signals into frequency-domain signals by FFT processing and outputs the resultant received signals to extraction section 204.

Extraction section 204 extracts, from the received signals to be received from FFT section 203, downlink control channel signals (i.e., PDCCH signals) in accordance with coding rate information to be received. More specifically, the number of CCEs (or R-CCEs) forming a downlink control information assignment resource varies depending on the coding rate. Thus, extraction section 204 uses the number of CCEs that corresponds to the coding rate as units of extraction processing, and extracts downlink control channel signals. In addition, the downlink control channel signals are extracted for each downlink component carrier. The extracted downlink control channel signals are outputted to demodulation section 205.

Extraction section 204 extracts downlink data (i.e., downlink data channel signals (i.e., PDSCH signals)) from the received signals on the basis of information on the downlink data assignment resource intended for terminal 200 to be received from determination section 207 to be described, hereinafter, and outputs the downlink data to demodulation section 209. As described above, extraction section 204 receives the downlink assignment control information (i.e., DCI) mapped to the PDCCH and receives the downlink data on the PDSCH.

Demodulation section 205 demodulates the downlink control channel signals received from extraction section 204 and outputs the obtained result of demodulation to decoding section 206.

Decoding section 206 decodes the result of demodulation received from demodulation section 205 in accordance with the received coding rate information and outputs the obtained result of decoding to determination section 207.

Determination section 207 performs blind-determination (i.e., monitoring) to find out whether or not the control information included in the result of decoding received from decoding section 206 is the control information intended for terminal 200. This determination is made in units of decoding results corresponding to the units of extraction processing. For example, determination section 207 demasks the CRC bits by the terminal ID of terminal 200 and determines that the control information resulted in CRC=OK (no error) as the control information intended for terminal 200. Determination section 207 outputs information on the downlink data assignment resource intended for terminal 200, which is included in the control information intended for terminal 200, to extraction section 204.

In addition, when detecting the control information (i.e., downlink assignment control information) intended for terminal 200, determination section 207 informs control section 208 that ACK/NACK signals will be generated (or are present). Moreover, when detecting the control information intended for terminal 200 from PDCCH signals, determination section 207 outputs information on a CCE that has been occupied by the PDCCH to control section 208.

Control section 208 identifies the A/N resource associated with the CCE on the basis of the information on the CCE received from determination section 207. Control section 208 outputs, to primary-spreading section 214-1, a base sequence and a cyclic shift value corresponding to the A/N resource associated with the CCE or the A/N resource previously indicated by base station 100, and also outputs a Walsh sequence and a DFT sequence corresponding to the A/N resource to secondary-spreading section 215-1. In addition, control section 208 outputs the frequency resource information on the A/N resource to IFFT section 218-1.

When determining to transmit bundled ACK/NACK signals using a bundled ACK/NACK resource, control section 208 outputs the base sequence and cyclic shift value corresponding to the reference signal part (i.e., reference signal resource) of the bundled ACK/NACK resource previously indicated by base station 100 to primary-despreading section 214-2 and outputs a Walsh sequence to secondary-despreading section 215-2. In addition, control section 208 outputs the frequency resource information on the bundled ACK/NACK resource to IFFT section 218-2.

Control section 208 outputs a DFT sequence used for spreading the data part of the bundled ACK/NACK resource to spreading section 217 and outputs the frequency resource information on the bundled ACK/NACK resource to IFFT section 218-3.

Control section 208 selects the bundled ACK/NACK resource or the A/N resource and instructs selection section 221 to output the selected resource to radio transmitting section 222. Moreover, control section 208 instructs response signal generating section 212 to generate the bundled ACK/NACK signals or the ACK/NACK signals in accordance with the selected resource.

Demodulation section 209 demodulates the downlink data received from extraction section 204 and outputs the demodulated downlink data to decoding section 210.

Decoding section 210 decodes the downlink data received from demodulation section 209 and outputs the decoded downlink data to CRC section 211.

CRC section 211 generates the decoded downlink data received from decoding section 210, performs error detection on the data for each downlink component carrier using CRC and outputs an ACK when CRC=OK (no error) or outputs a NACK when CRC=Not OK (error) to response signal generating section 212. Moreover, CRC section 211 outputs the decoded downlink data as the received data when CRC=OK (no error).

Response signal generating section 212 generates response signals on the basis of the reception condition of downlink data (i.e., result of error detection on downlink data) on each downlink component carrier inputted from CRC section 211. More specifically, when instructed to generate the bundled ACK/NACK signals from control section 208, response signal generating section 212 generates the bundled ACK/NACK signals including the results of error detection for the respective component carriers as individual data items. Meanwhile, when instructed to generate ACK/NACK signals from control section 208, response signal generating section 212 generates ACK/NACK signals of one symbol. Response signal generating section 212 generates the ACK/NACK signals by performing bundling (including spatial bundling and time-domain bundling) on the results of error detection so that the total number of bits of the results of error detection of the downlink data items obtained in CRC section 211 becomes the number of bits for reporting the results of error detection (that is, the number of bits of ACK/NACK signals). Response signal generating section 212 outputs the generated response signals to coding and modulation section 213. The details of the method of bundling ACK/NACK signals in response signal generating section 212 will be described, hereinafter.

Upon reception of the bundled ACK/NACK signals, coding and modulation section 213 encodes and modulates the received bundled ACK/NACK signals to generate the modulation signals of 12 symbols and outputs the modulation signals to DFT section 216. In addition, upon reception of the ACK/NACK signals of one symbol, coding and modulation section 213 modulates the ACK/NACK signals and outputs the modulation signals to primary-spreading section 214-1.

Primary-spreading sections 214-1 and 214-2 corresponding to the A/N resources and reference signal resources of the bundled ACK/NACK resources spread the ACK/NACK signals or reference signals using the base sequence corresponding to the resources in accordance with the instruction from control section 208 and output the spread signals to secondary-spreading sections 215-1 and 215-2.

Secondary-spreading sections 215-1 and 215-2 spread the received primary-spread signals using a Walsh sequence or a DFT sequence in accordance with an instruction from control section 208 and outputs the spread signals to IFFT sections 218-1 and 218-2.

DFT section 216 performs DFT processing on 12 time-series sets of received bundled ACK/NACK signals to obtain 12 signal components in the frequency-domain. DFT section 216 outputs the 12 signal components to spreading section 217.

Spreading section 217 spreads the 12 signal components received from DFT section 216 using a DFT sequence indicated by control section 208 and outputs the spread signal components to IFFT section 218-3.

IFFT sections 218-1, 218-2 and 218-3 perform IFFT processing on the received signals in association with the frequency positions where the signals are to be mapped, in accordance with an instruction from control section 208. Accordingly, the signals inputted to IFFT sections 218-1, 218-2 and 218-3 (i.e., ACK/NACK signals, the reference signals of A/N resource, the reference signals of bundled ACK/NACK resource and bundled ACK/NACK signals) are transformed into time-domain signals.

CP adding sections 219-1, 219-2 and 219-3 add the same signals as the last part of the signals obtained by IFFT processing to the beginning of the signals as a CP.

Time-multiplexing section 220 time-multiplexes the bundled ACK/NACK signals received from CP adding section 219-3 (i.e., signals transmitted using the data part of the bundled ACK/NACK resource) and the reference signals of the bundled ACK/NACK resource to be received from CP adding section 219-2 on the bundled ACK/NACK resource and outputs the multiplexed signals to selection section 221.

Selection section 221 selects one of the bundled ACK/NACK resource received from time-multiplexing section 220 and the A/N resource received from CP adding section 219-1 in accordance with an instruction from control section 208 and outputs the signals assigned to the selected resource to radio transmitting section 222.

Radio transmitting section 222 performs transmission processing such as D/A conversion, amplification and up-conversion and/or the like on the signals received from selection section 221 and transmits the resultant signals to base station 100 via an antenna.

[Operations of Base Station 100 and Terminal 200]

Operations of base station 100 and terminal 200 having the above-described configurations will be described.

In the present embodiment, response signal generating section 212 of terminal 200 performs spatial bundling on the bits of results of error detection to be reported to base station 100. Response signal generating section 212 then performs time-domain bundling for each component carrier based on the number of bits of each CC (that is, ratio of the number of bits between CCs) after spatial bundling (before time-domain bundling), and thereby allocates response signal reporting bits so that the bundling ratio becomes uniform with respect to every CC.

To be more specific, response signal generating section 212 determines the number of bits for each CC to be mapped in Step3 in FIG. 6A based on the ratio of the number of bits of results of error detection between CCs after spatial bundling but before time-domain bundling. Response signal generating section 212 then performs time-domain bundling for each CC so that the result of error detection of each CC becomes the determined number of bits.

The above-described "bundling ratio" is the ratio of the number of bits of results of error detection after bundling to the number of bits of results of error detection before bundling (spatial and time-domain bundling). For example, when an 8-bit result of error detection is bundled into two bits, the bundling ratio is 0.25 (=2/8). Furthermore, for example, when a 2-bit result of error detection is not bundled, the bundling ratio is 1 (=2/2).

Figure 3:
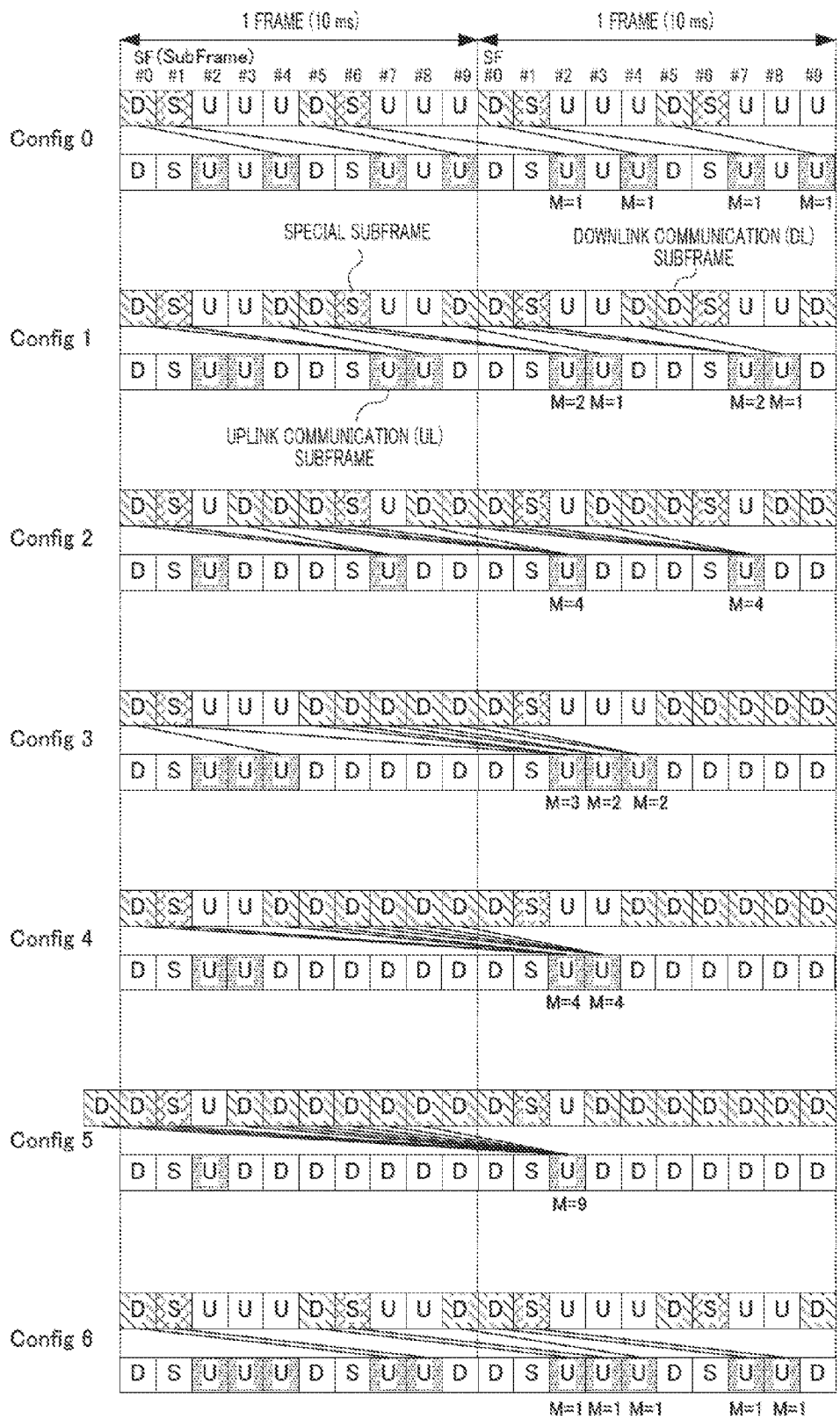
FIG. 3 is a diagram provided for describing a UL-DL configuration in TDD.
Figure 4B:
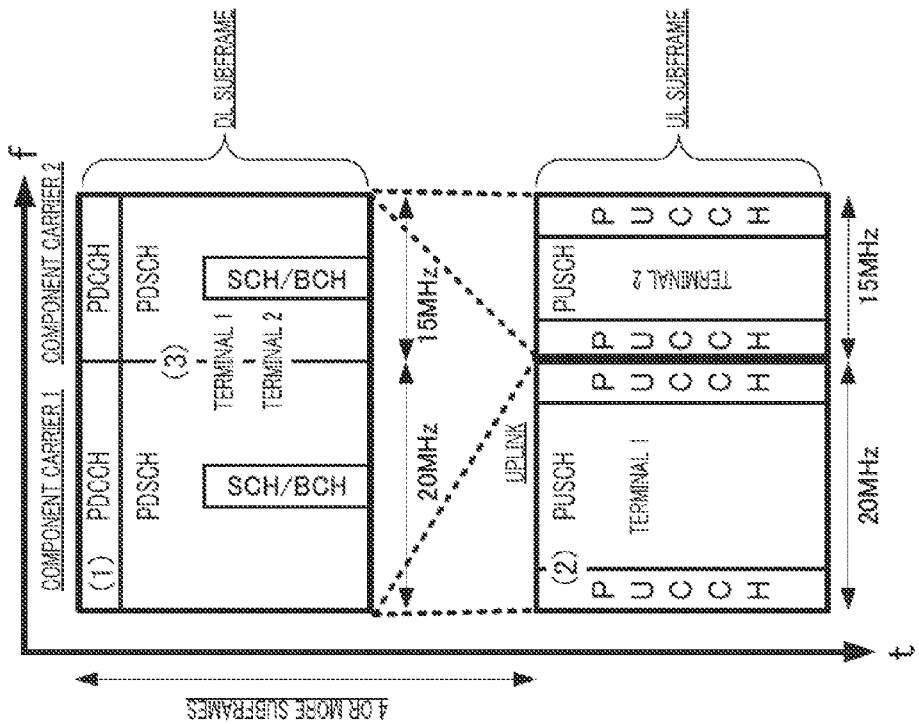
FIGS. 4A and 4B are diagrams provided for describing asymmetric carrier aggregation and a control sequence applied to individual terminals.
Figure 4A:
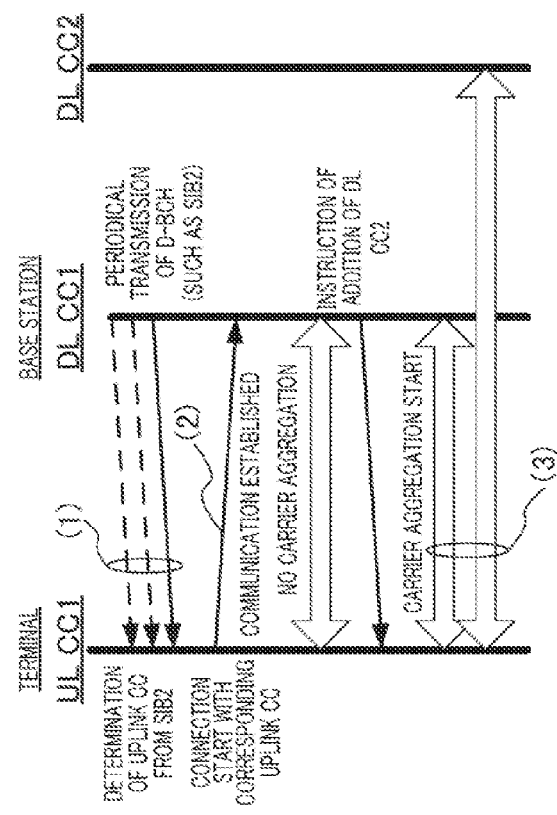
Figure 5:
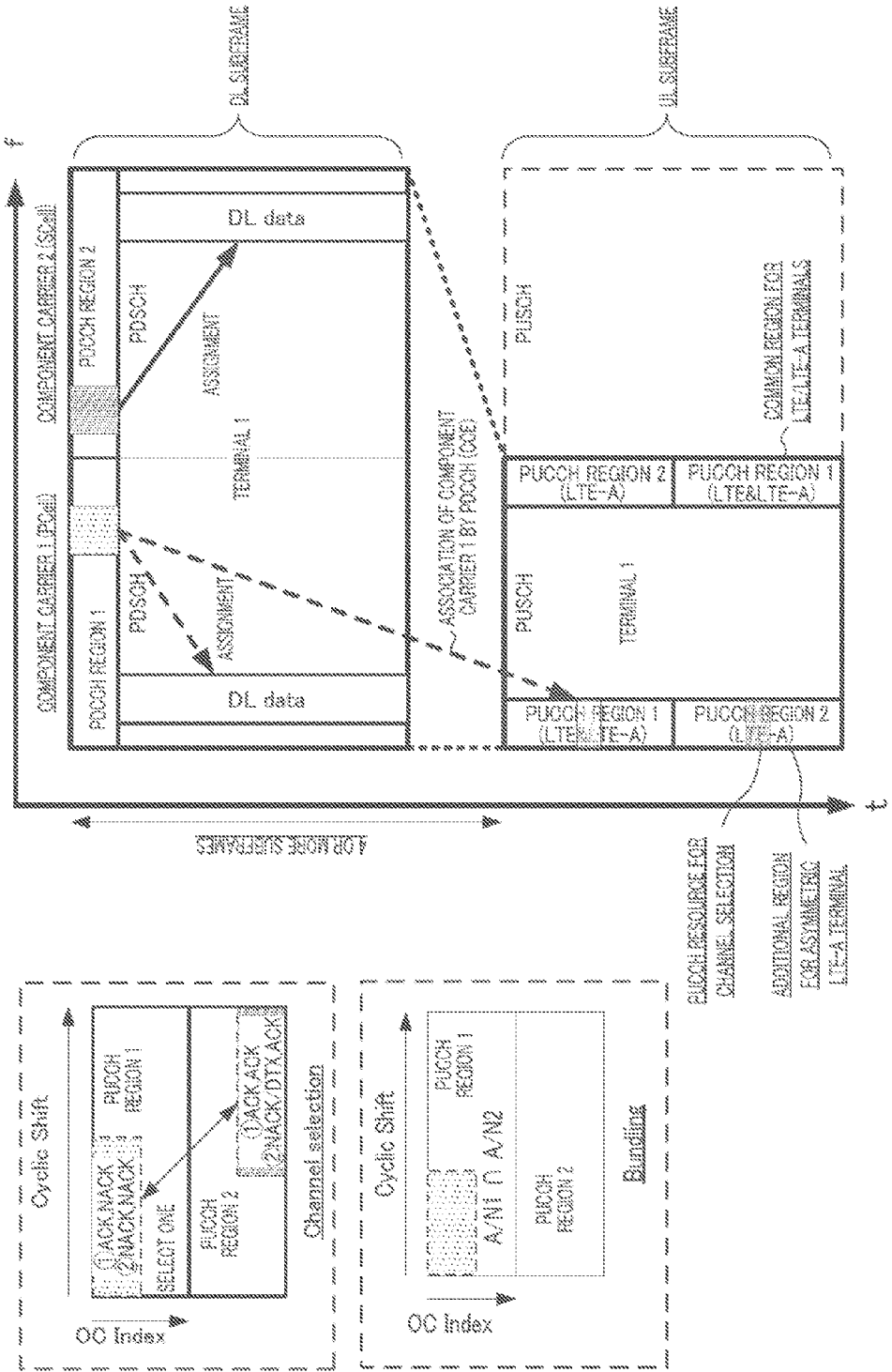
FIG. 5 is a diagram provided for describing channel selection.
Figure 11:
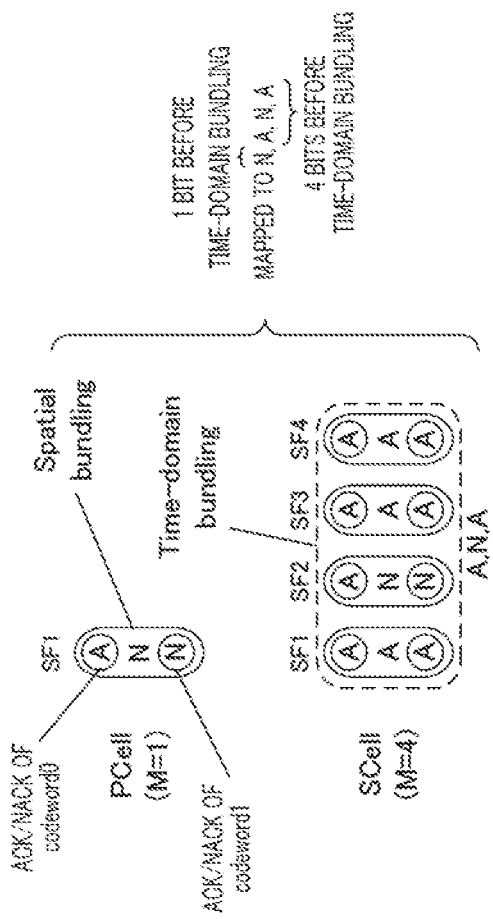
FIG. 11 illustrates an example of bundling processing according to Embodiment 1 of the present invention.

As shown in FIG. 11, a case will be described below as an example where two CCs (one PCell, one SCell) are configured for terminal 200. Furthermore, as shown in FIG. 11, M=1 is set in PCell and M=4 is set in SCell. That is, in FIG. 11, the UL-DL configuration varies between component carriers. Furthermore, in FIG. 11, a MIMO mode (transmission mode supporting up to two-CW transmission in downlink) is set for both PCell and SCell. That is, FIG. 11 illustrates an example in the case of UL subframe timing in each component carrier when PCell is M=1 (MIMO) and SCell is M=4 (MIMO). UL subframe timing in such a combination of values of M is generated in subframe #2 and subframe #7, for example, when the UL-DL configuration of PCell is Config 0 shown in FIG. 3 and the UL-DL configuration of SCell is Config 2.

In FIG. 11, the result of error detection corresponding to CW0 of PCell is ACK(A) and the result of error detection corresponding to CW1 of PCell is NACK(N). Furthermore, in FIG. 11, the results of error detection corresponding to CW0 of SCell are "ACK, ACK, ACK, ACK" in order of subframes (SF) 1, 2, 3, 4. In FIG. 11, the results of error detection corresponding to CW1 of SCell are "ACK, NACK, ACK, ACK" in order of subframes (SF) 1, 2, 3, 4.

Hereinafter, "spatial bundling" and "time-domain bundling" in response signal generating section 212 will be described, respectively.

(Spatial Bundling)

Response signal generating section 212 performs spatial bundling (logical AND) in each component carrier. For example, in FIG. 11, response signal generating section 212 takes logical AND between ACK and NACK in PCell and obtains NACK. Similarly, in FIG. 11, response signal generating section 212 takes logical AND between the results of error detection of CW0 and the results of error detection of CW1 in SCell and obtains ACK, NACK, ACK, ACK in order of SF1, 2, 3, 4. As a result, as shown in FIG. 11, the number of bits of the results of error detection after spatial bundling is 1 bit in PCell and 4 bits in SCell.

Here, conditions for performing spatial bundling in response signal generating section 212 are as follows.

(Bundling target 1) When M≥3 in at least one component carrier, response signal generating section 212 performs spatial bundling on all component carriers for which a transmission mode supporting up to two-CW transmission is set.

(Bundling target 2) Response signal generating section 212 performs spatial bundling on component carriers with M=2 except bundling target 1 for which a transmission mode supporting up to two-CW transmission is set.

Response signal generating section 212 does not perform spatial bundling on component carriers other than component carriers corresponding to bundling target 1 and bundling target 2.

Figure 12:
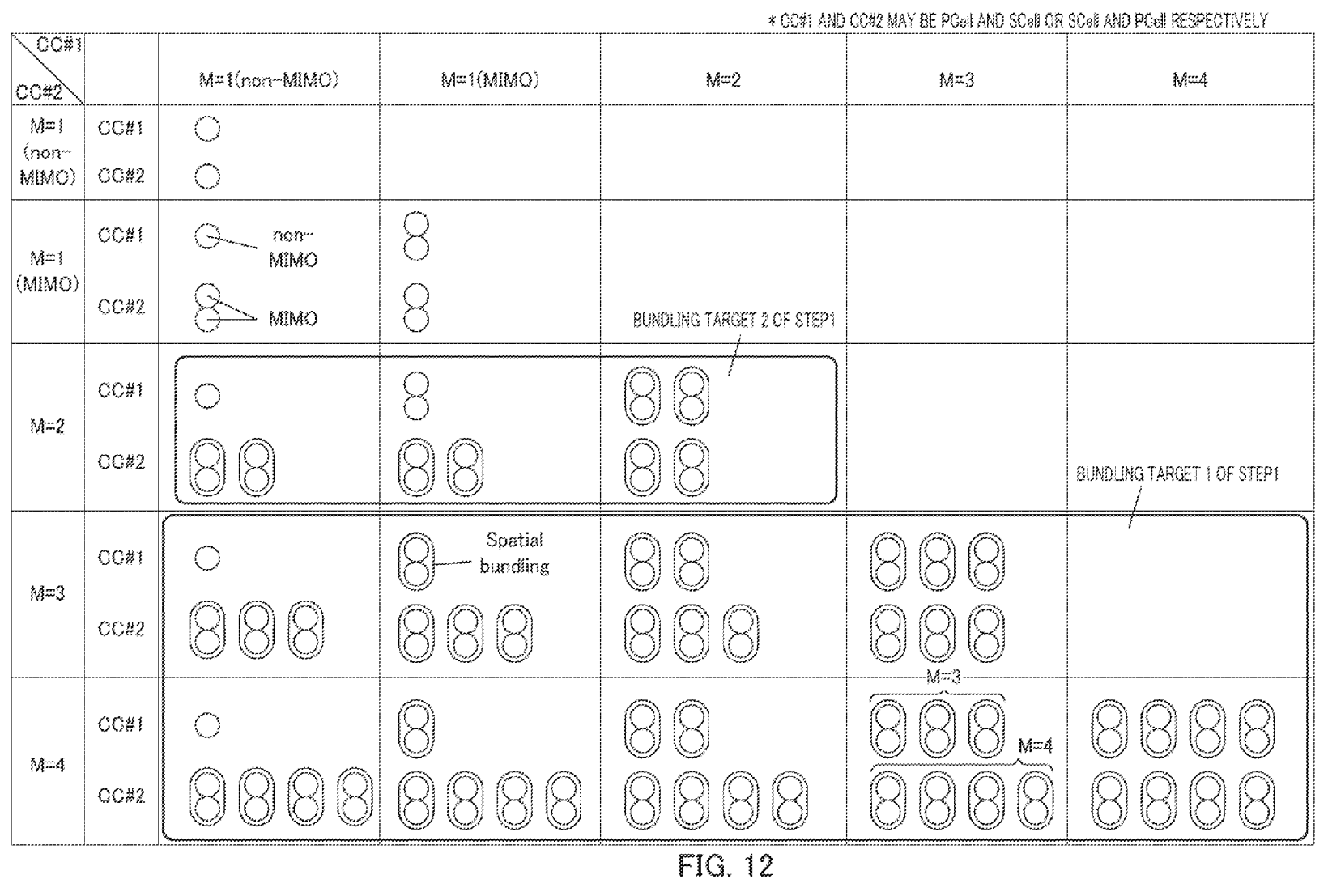

FIG. 12 illustrates bundling targets of spatial bundling (Step1) according to the above-described conditions. For example, the example in FIG. 11 corresponds to a case where M=1 (MIMO) in CC#1 and M=4 in CC#2 shown in FIG. 12.

Under the above conditions, spatial bundling is not performed on a CC with M=1 (MIMO) in a combination of M=1 (MIMO) and M=2. However, response signal generating section 212 may perform spatial bundling on this CC as well. In that case, the condition for performing spatial bundling is "when M≥2 in at least one component carrier, response signal generating section 212 performs spatial bundling on all component carriers for which a transmission mode supporting up to two-CW transmission is set, and response signal generating section 212 does not perform spatial bundling on other component carriers."

(Time-Domain Bundling)

When the total number of bits of component carriers after spatial bundling is greater than the number of bits for reporting results of error detection (number of bits of ACK/NACK signals), response signal generating section 212 performs time-domain bundling.

For example, in FIG. 11, after performing spatial bundling, the result of error detection of PCell is 1 bit and the result of error detection of SCell is 4 bits, bringing the total to 5 bits. In FIG. 11 (M=1 (MIMO in PCell), M=4 in SCell), an ACK/NACK signal is transmitted using 4 bits. Response signal generating section 212 thus performs time-domain bundling on each component carrier to map 5 bits after spatial bundling to a 4-bit mapping table.

Here, the ratio of the number of bits of results of error detection after time-domain bundling to the number of bits of results of error detection before time-domain bundling (after spatial bundling) is defined as a "time-domain bundling ratio."

Response signal generating section 212 determines the number of bits of results of error detection after time-domain bundling for each component carrier so that the time-domain bundling ratio becomes uniform between component carriers. To be more specific, response signal generating section 212 determines the number of bits of results of error detection for each component carrier after time-domain bundling based on the ratio of the number of bits of results of error detection between component carriers before time-domain bundling (after spatial bundling).

To be more specific, response signal generating section 212 determines the number of bits of results of error detection in PCell after time-domain bundling and the number of bits of results of error detection in SCell after time-domain bundling respectively based on the ratio between the number of bits of results of error detection in PCell immediately after spatial bundling and the number of bits of results of error detection in SCell immediately after spatial bundling. Response signal generating section 212 then performs time-domain bundling on results of error detection after spatial bundling of each component carrier for each component carrier according to the determined number of bits.

For example, in FIG. 11, the number of bits of results of error detection of a component carrier before time-domain bundling (immediately after spatial bundling) is 1 bit in PCell and 4 bits in SCell. That is, in FIG. 11, the bit ratio of results of error detection between PCell and SCell before time-domain bundling (immediately after spatial bundling) is 1:4.

First, response signal generating section 212 allocates ACK/NACK signal reporting bits (4 bits) so that the ratio of the number of bits of results of error detection between PCell and SCell after time-domain bundling becomes the ratio of the number of bits of results of error detection between PCell and SCell before time-domain bundling (immediately after spatial bundling). For example, in FIG. 11, the ratio of the number of bits of results of error detection of PCell in the total number of bits (4 bits) of results of error detection after time-domain bundling is (1/5)×4=0.8. Similarly, in FIG. 11, the ratio of the number of bits of results of error detection of SCell in the total number of bits (4 bits) of results of error detection before time-domain bundling (immediately after spatial bundling) is (4/5)×4=3.2.

Next, response signal generating section 212 determines the number of bits of results of error detection after time-domain bundling so that the total number of bits of results of error detection after time-domain bundling becomes 4 bits (number of bits of ACK/NACK signals), each component carrier has a natural number of bits and the difference in the time-domain bundling ratio between component carriers becomes a minimum.

That is, response signal generating section 212 sets the ratio of the number of bits of results of error detection in PCell after time-domain bundling and the number of bits of results of error detection in SCell after time-domain bundling with respect to the number of bits of ACK/NACK signals (4 bits in FIG. 11) to a natural number approximate to the ratio between the number of bits of results of error detection in PCell before time-domain bundling (immediately after spatial bundling) and the number of bits of results of error detection in SCell before time-domain bundling (immediately after spatial bundling). Furthermore, response signal generating section 212 minimizes the difference in the time-domain bundling ratio between PCell and SCell (ratio of the number of bits of results of error detection after time-domain bundling to the number of bits of results of error detection before time-domain bundling). Furthermore, response signal generating section 212 makes the total number of bits of results of error detection in PCell and SCell after time-domain bundling equal to the number of bits (4 bits) of ACK/NACK signals.

For example, in FIG. 11, according to the ratio (1:4) of the number of bits of results of error detection between PCell and SCell before time-domain bundling, the bit ratio of results of error detection between PCell and SCell in the ACK/NACK signals (4 bits) after time-domain bundling is 0.8:3.2 (=1:4). Thus, response signal generating section 212 determines the ratio (1:3) which is a natural number approximate to the above-described ratio (0.8:3.2), having a total of 4 bits as the ratio of results of error detection between PCell and SCell after time-domain bundling. Thus, in FIG. 11, response signal generating section 212 performs time-domain bundling for each component carrier so that the number of bits of results of error detection after time-domain bundling is 1 bit in PCell and 3 bits in SCell.

In FIG. 11, the number of bits in PCell is one (NACK) both before time-domain bundling and after time-domain bundling, and therefore time-domain bundling is substantially not performed. On the other hand, in FIG. 11, while the number of bits before time-domain bundling is four in SCell, the number of bits is three after time-domain bundling. That is, response signal generating section 212 performs time-domain bundling to reduce the number of bits of results of error detection from four to three.

FIG. 13 illustrates an example of a bundling method when performing bundling from four bits to three bits. In FIG. 13, assuming that the probability of occurrence of ACKs is 90%, the probability of occurrence of NACKs is 9% and the probability of occurrence of DTX is 1%, mapping is performed so that a combination of results of error detection having a high probability of occurrence of 4-bit results of error detection is assigned to one state (mapped state). For example, among combinations of 4-bit results of error detection, the probability of occurrence of a combination (ACK, ACK, ACK, ACK) is the highest $0.9^4 \times 100 = 65.61\%$. Next, the probability of occurrence of a combination with three ACKs, and one NACK or one DTX (e.g., (NACK/DTX, ACK, ACK, ACK)) is the second highest $0.9^3 \times 0.1 \times 100 = 7.29\%$. Thus, in FIG. 13, a combination of results of error detection having a high probability of occurrence is mapped to one state. Thus, terminal 200 can transmit a combination of results of error detection having a high probability of occurrence to base station 100 without missing any information due to bundling.

For example, in FIG. 11, when response signal generating section 212 performs time-domain bundling on results of error detection before time-domain bundling (ACK, NACK, ACK, ACK) into three bits on the basis of FIG. 13, (ACK, NACK, ACK) is obtained.

In FIG. 11, after time-domain bundling, results of error detection of 1 bit (NACK) of PCell and 3 bits (ACK, NACK, ACK) of SCell, a total of 4 bits, are obtained in this way.

Terminal 200 maps this 4-bit result of error detection (N, A, N, A) after time-domain bundling to the mapping table shown in Step3 in FIG. 6A, for example. That is, terminal 200 maps a phase point of +j (that is, (0, +1)) to PUCCH resource (A/N resource) h3 and reports it to base station 100.

In FIG. 11, the bundling ratio (the ratio of the number of bits of results of error detection after bundling to the number of bits of results of error detection before bundling) is 0.5 (=1/2) in PCell and 0.375 (=3/8) in SCell. Furthermore, the difference in the bundling ratio between the component carriers is 0.5−0.375=0.125.

Here, as in the case of FIG. 11, assuming M=1 (MIMO) in PCell, M=4 (MIMO) in SCell and the number of bits used to report ACK/NACK (the number of bits used for mapping in Step3) is four, a case will be described where a number of bits different from that of the present embodiment is allocated to each of the component carriers.

For example, when time-domain bundling is performed in such a way that the number of bits of results of error detection after time-domain bundling is three in PCell and one in SCell, the bundling ratio of PCell is 1.5 (=3/2) and the bundling ratio of SCell is 0.125 (=1/8), and the difference between the two is 1.5−0.125=1.375.

On the other hand, for example, when time-domain bundling is performed in such a way that the number of bits of results of error detection after time-domain bundling is two in PCell and two in SCell, the bundling ratio of PCell is 1 (=2/2) and the bundling ratio of SCell is 0.25 (=2/8), and the difference between the two is 1−0.25=0.75.

When these differences are compared, the difference in the bundling ratio between the component carriers is a minimum in the present embodiment (0.125). That is, the bundling ratio of each component carrier is most uniform when the present embodiment is applied.

Figure 14:
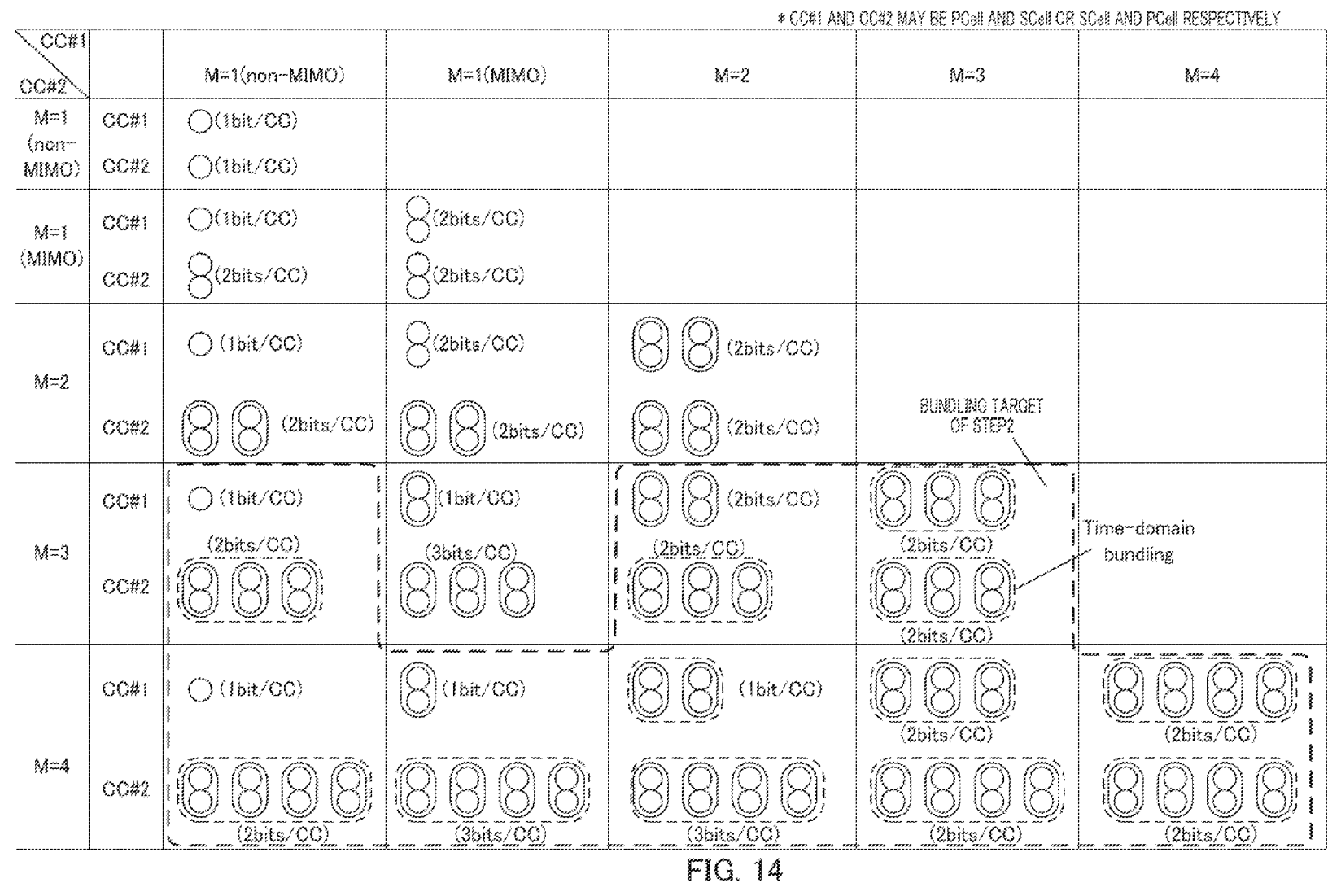

FIG. 14 illustrates a time-domain bundling method also including combinations with other values of M other than the aforementioned combination with M=1 (MIMO) in PCell and M=4 in SCell. As shown in FIG. 14, when the sum of the values of M of the respective component carriers is greater than the number of bits used for mapping in Step3 (the number of bits reporting ACK/NACK signals), response signal generating section 212 performs time-domain bundling (Step2).

The number of bits used for mapping in Step3 is four, for example, when the number of bits of results of error detection after spatial bundling shown in FIG. 12 is four or more. Likewise, the number of bits used for mapping in Step3 is three just as is when the number of bits of results of error detection after spatial bundling shown in FIG. 12 is three, and when the number of bits of results of error detection after spatial bundling shown in FIG. 12 is two, the number of bits is also two just as is. However, as shown in FIG. 14, when M=1 (non-MIMO) for one component carrier and M=3 or M=4 for the other, the number of bits used for mapping in Step3 is three. However, when M=1 (non-MIMO) for one component carrier and M=3 or M=4 for the other, the number of bits used for mapping in Step3 may be four. In this case, the number of bits to be allocated to the component carrier with M=1 (non-MIMO) is assumed to be one and the number of bits to be allocated to the component carrier with M=3 or M=4 is assumed to be three.

Here, a case will be described where there is a concentration of the bundling ratios between component carriers (the ratio of the number of bits of results of error detection after bundling to the number of bits of results of error detection before bundling). When there is a concentration of the bundling ratios between the component carriers, it is no longer possible to protect results of error detection for one component carrier having a low bundling ratio from bundling (that is, missing of a certain amount of information). In contrast, results of error detection for the other component carrier having a high bundling ratio may be excessively protected from bundling. For this reason, the detection accuracy of results of error detection that can be determined by base station 100 becomes poor in the component carrier having a low bundling ratio than the component carrier having a high bundling ratio. For example, in the case of a component carrier having a bundling ratio of 1.0 (that is, component carrier having a high bundling ratio, without bundling), if the results of error detection of CW0 and CW1 is reported as (NACK, ACK) to base station 100, base station 100 can uniquely determine that the results of error detection corresponding to CW0 is NACK and the results of error detection corresponding to CW1 is ACK. On the other hand, in the case of a component carrier having a low bundling ratio, even when three or more results of error detection are reported as (NACK, NACK) to base station 100, base station 100 cannot uniquely determine the three or more results of error detection before bundling.

In contrast, in the present embodiment, terminal 200 makes the bundling ratio uniform with respect to each component carrier, and can thereby avoid the detection accuracy of results of error detection that can be determined by base station 100 from deteriorating in some of a plurality of component carriers. This makes it possible to reduce the probability of missing ACK/NACK information for a component carrier of higher priority due to bundling. Thus, according to the present embodiment, it is possible to improve transmission efficiency of ACK/NACK information in all component carriers configured for terminal 200.

Results of error detection in the spatial region have a higher error correlation than results of error detection in the time domain. Thus, in the present embodiment, terminal 200 performs spatial bundling prior to time-domain bundling. In the example shown in FIG. 11, terminal 200 reduces 5 bits of total 10 bits of results of error detection before bundling via spatial bundling and reduces 1 of 5 bits after spatial bundling via time-domain bundling. In this way, terminal 200 reduces 10 bits of results of error detection before bundling to 4 bits (number of bits of ACK/NACK signals) via bundling. That is, terminal 200 can use more bundling of results of error detection in the spatial region having a high error correlation, and thereby has an effect of increasing detection accuracy of results of error detection at base station 100 when PCell and SCell are viewed as a whole.

On the other hand, as in the case of response signal generating section 212 of terminal 200, A/N determining section 118 of base station 100 determines a plurality of results of error detection shown in a response signal reported from terminal 200 based on the transmission mode, and UL-DL configuration (that is, the value of M) set in terminal 200 as the processing target. For example, A/N determining section 118 identifies a bundling method for a response signal in terminal 200 according to the transmission mode and the value of M set in each component carrier shown in FIG. 12.

According to the present embodiment, when ARQ is applied in communication using an uplink component carrier and a plurality of downlink component carriers associated with the uplink component carrier, and when a UL-DL configuration (ratio between UL subframes and DL subframes) set for each component carrier varies, it is possible to correctly transmit and receive results of error detection by bundling a plurality of results of error detection.

The present embodiment has been described with a case where terminal 200 performs spatial bundling first, then determines bit allocation of results of error detection for each component carrier so as to smooth out the bundling ratios between component carriers and performs time-domain bundling. However, terminal 200 need not always determine the bit allocation of results of error detection for each component carrier after spatial bundling. For example, terminal 200 may determine the bit allocation of results of error detection so as to smooth out the bundling ratio between component carriers before spatial bundling, then perform spatial bundling and then further perform time-domain bundling.

For example, a case will be described where M=4 (MIMO) in PCell and M=4 (non-MIMO) in SCell. In this case, before bundling, the result of error detection of PCell is 8 bits and the result of error detection of SCell is 4 bits. Terminal 200 determines the number of bits of results of error detection after spatial bundling and time-domain bundling for each component carrier so that the bundling ratio (the ratio of the number of bits of results of error detection after bundling to the number of bits of results of error detection before bundling) becomes uniform with respect to every CC. To be more specific, the number of bits of results of error detection after spatial bundling and time-domain bundling is (8/12)×4=2.67 in PCell, and (4/12)×4=1.33 in SCell. Thus, the terminal has a total of 4 bits, and determines the number of bits of results of error detection after spatial bundling and time-domain bundling so as to obtain a natural number of bits for each component carrier and minimize the difference in the time-domain bundling ratio between the component carriers. Here, the terminal performs spatial bundling and time-domain bundling so as to obtain 3 bits in PCell and 1 bit in SCell.

(Embodiment 2)

The present embodiment is similar to Embodiment 1 in that terminal 200 (FIG. 10) determines the number of bits of results of error detection to be reported to base station 100 (FIG. 9) based on the number of bits of results of error detection of each CC after spatial bundling (ratio of the number of bits between CCs). In Embodiment 1, terminal 200 performs time-domain bundling for each CC individually and allocates bits so that the bundling ratio becomes uniform between CCs. In contrast, the present embodiment is different from Embodiment 1 in that terminal 200 performs time-domain bundling and frequency-domain bundling (bundling in the frequency domain (frequency-domain bundling)) across all CCs so that the bundling ratio becomes uniform between CCs.

To be more specific, response signal generating section 212 of terminal 200 performs time-domain bundling and frequency-domain bundling so that the number of bits of results of error detection of all CCs obtained after spatial bundling becomes the number of bits to be mapped in Step3 in FIG. 6A (number of bits of ACK/NACK signals).

Figure 15:
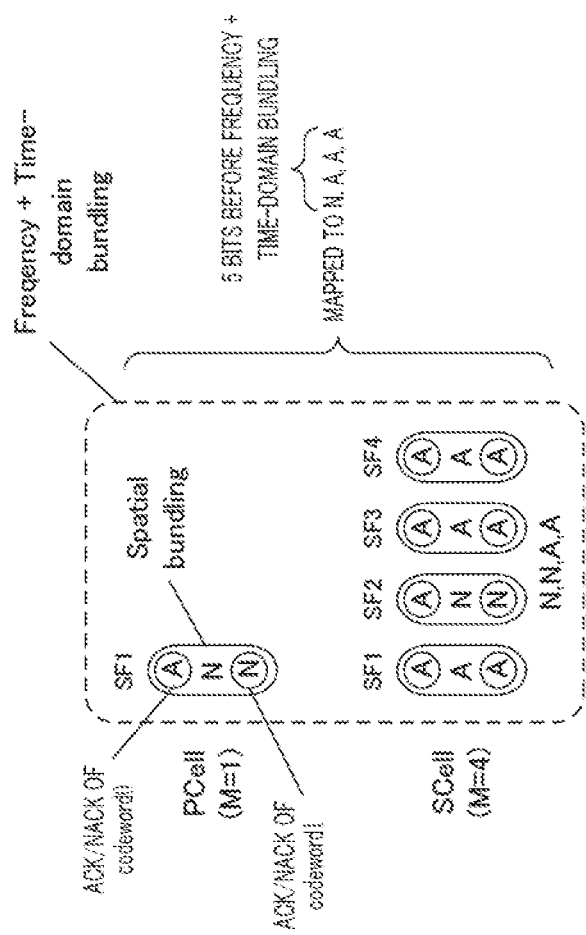
FIG. 15 illustrates an example of bundling processing according to Embodiment 2 of the present invention.

A case will be described below as an example where as in the case of Embodiment 1 (FIG. 11), two CCs (one PCell, one SCell) are configured for terminal 200 as shown in FIG. 15. Moreover, as shown in FIG. 15, M=1 is set in PCell and M=4 is set in SCell. In FIG. 15, the result of error detection corresponding to CW0 of PCell is ACK(A) and the result of error detection corresponding to CW1 of PCell is NACK(N). In FIG. 15, the results of error detection corresponding to CW0 of SCell are "ACK, ACK, ACK, ACK" in order of subframes (SF) 1, 2, 3, 4. In FIG. 15, the results of error detection corresponding to CW1 of SCell are "ACK, NACK, ACK, ACK" in order of subframes (SF) 1, 2, 3, 4.

Hereinafter, "time-domain bundling and frequency-domain bundling" in response signal generating section 212 will be described. Since "spatial bundling" in the present embodiment is similar to that in Embodiment 1, description thereof will be omitted.

(Time Domain and Frequency Domain Bundling)

When the total number of bits of each component carrier after spatial bundling is greater than the number of bits for reporting results of error detection (number of bits of ACK/NACK signals), response signal generating section 212 performs time-domain bundling.

In FIG. 15, after performing spatial bundling, the result of error detection of PCell is 1 bit and the result of error detection of SCell is 4 bits, bringing the total to 5 bits. In FIG. 15 (M=1 (MIMO) in PCell, M=4 in SCell), ACK/NACK signals are transmitted using 4 bits. Response signal generating section 212 performs time-domain bundling and frequency-domain bundling over PCell and SCell to map 5 bits after spatial bundling to a 4-bit mapping table.

To be more specific, in FIG. 15, response signal generating section 212 performs time-domain bundling and frequency-domain bundling on results of error detection of PCell and SCell (total 5 bits) before time-domain and frequency-domain bundling (immediately after spatial bundling) over PCell and SCell. That is, in FIG. 15, response signal generating section 212 performs time-domain bundling and frequency-domain bundling using a bundling method (not shown) of bundling from 5 bits to 4 bits.

In FIG. 15, response signal generating section 212 performs time-domain bundling and frequency-domain bundling on a total of 5 bits of NACK in PCell and ACK, NACK, ACK, ACK in SCell after spatial bundling and obtains 4 bits of NACK, ACK, ACK, ACK.

Thus, in FIG. 15, the bundling ratio (the ratio of the number of bits of results of error detection after bundling to the number of bits of results of error detection before bundling) is 0.4 (=(1/2)×(4/5)) in PCell and 0.4 (=(4/8)×(4/5)) in SCell, and it is thereby clear that the bundling ratio is completely smoothed out between the component carriers. In other words, in the number of bits of ACK/NACK signals, the ratio (1:4) between the number of bits (0.8 bits) corresponding to results of error detection of PCell and the number of bits (3.2 bits) corresponding to results of error detection of SCell is the same as the ratio (1:4) between the number of bits of results of error detection (1 bit) in PCell immediately after spatial bundling and the number of bits of results of error detection (4 bits) in SCell immediately after spatial bundling. That is, the present embodiment (FIG. 15) can smooth out the bundling ratio between the component carriers more than the bundling method shown in Embodiment 1 (difference in the bundling ratio between component carriers: 0.125).

Figure 16:
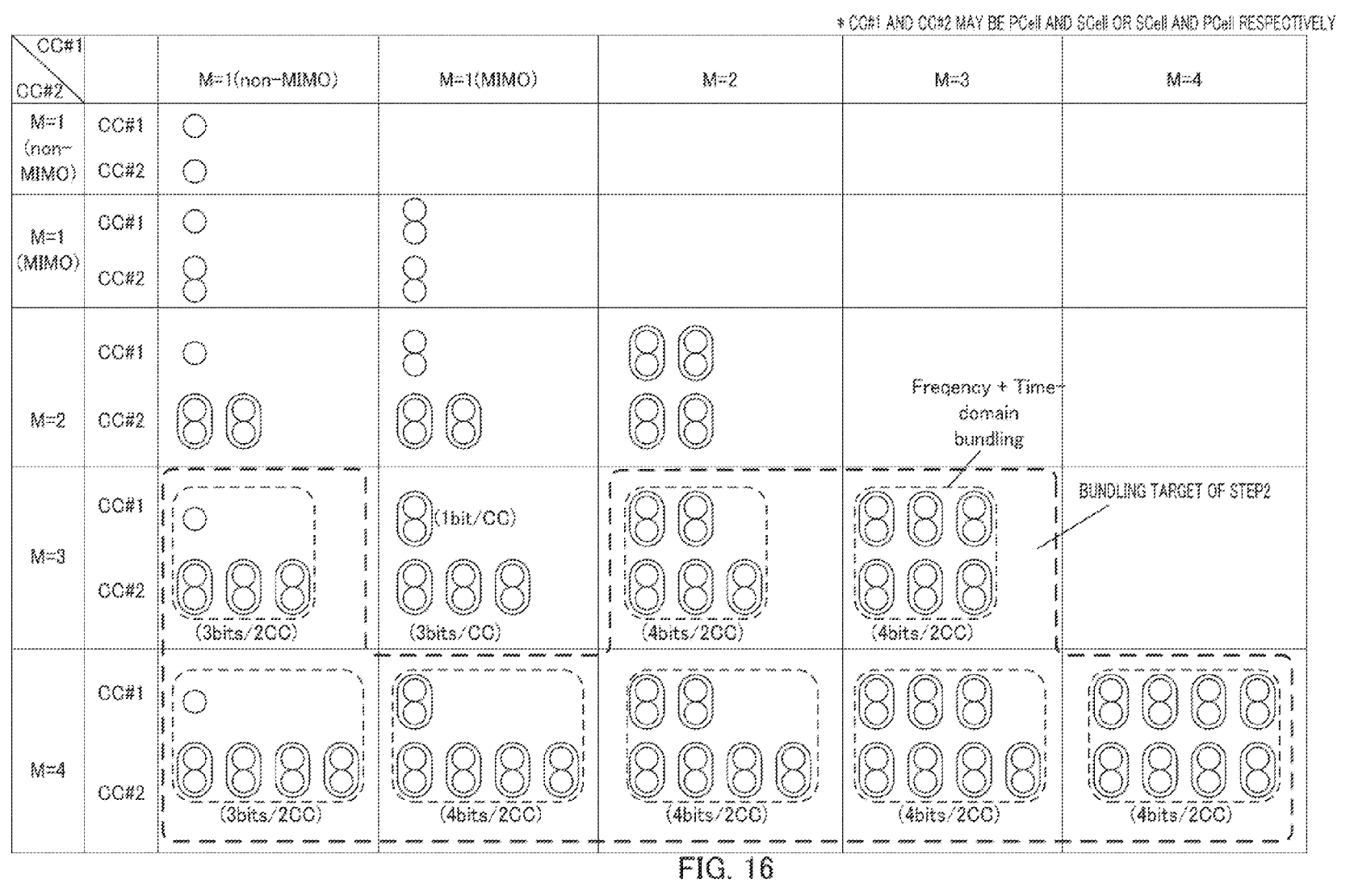

FIG. 16 illustrates the time-domain bundling and frequency-domain bundling method also including combinations of other values of M other than the aforementioned combination of M=1 (MIMO) in PCell and M=4 in SCell. As shown in FIG. 16, when the sum of the values of M of the respective component carriers is greater than the number of bits used for mapping in Step3 (the number of bits of ACK/NACK signals), response signal generating section 212 performs time-domain bundling and frequency-domain bundling (that is, Step2).

The number of bits used for mapping in Step3 is four when the number of bits of results of error detection after spatial bundling shown in FIG. 16 is four or more as in the case of FIG. 15. Likewise, when the number of bits of results of error detection after spatial bundling shown in FIG. 16 is three, the number of bits used for mapping in Step3 is three just as is and when the number of bits of results of error detection after spatial bundling shown in FIG. 16 is two, the number of bits is also two just as is. However, as shown in FIG. 16, when M=1 (non-MIMO) for one component carrier and M=3 or M=4 for the other, the number of bits used for mapping in Step3 is three. However, when M=1 (non-MIMO) for one component carrier and M=3 or M=4 for the other, the number of bits used for mapping in Step3 may be four.

In this way, in the present embodiment, terminal 200 makes the bundling ratios uniform with respect to each component carrier, and can thereby avoid the detection accuracy of results of error detection of some component carriers of a plurality of component carriers that can be determined by base station 100 from deteriorating. This makes it possible to reduce the probability of missing ACK/NACK information for a component carrier with higher priority due to bundling. Thus, according to the present embodiment, it is possible to improve transmission efficiency of ACK/NACK information in all component carriers configured for terminal 200.

In the present embodiment, like Embodiment 1, terminal 200 applies bundling on results of error detection more in the spatial region which has a high error correlation than in the time domain. This provides an effect of increasing detection accuracy of results of error detection in base station 100 when PCell and SCell are viewed as a whole.

Thus, according to the present invention, when ARQ is applied in communication using an uplink component carrier and a plurality of downlink component carriers associated with the uplink component carrier, and when a UL-DL configuration (ratio between UL subframes and DL subframes) set for each component carrier varies, it is possible to correctly transmit and receive results of error detection by bundling a plurality of results of error detection.

(Embodiment 3)

A case has been described in Embodiments 1 and 2 where terminal 200 (FIG. 10) performs time-domain bundling (or frequency-domain bundling) for each CC based on the number of bits of results of error detection (ratio of the number of bits between CCs) after spatial bundling. In contrast, the present embodiment will be described with a case where terminal 200 performs bundling for each CC based on the number of bits of results of error detection before bundling (spatial bundling and time-domain bundling).

To be more specific, response signal generating section 212 (FIG. 10) of terminal 200 determines the number of bits per CC to be mapped in Step3 in FIG. 6A based on the ratio in the number of bits of results of error detection between CCs before bundling. Response signal generating section 212 then performs bundling (spatial bundling and time-domain bundling) for each CC so that the number of bits of results of error detection of each CC matches the determined number of bits.

Figure 17:
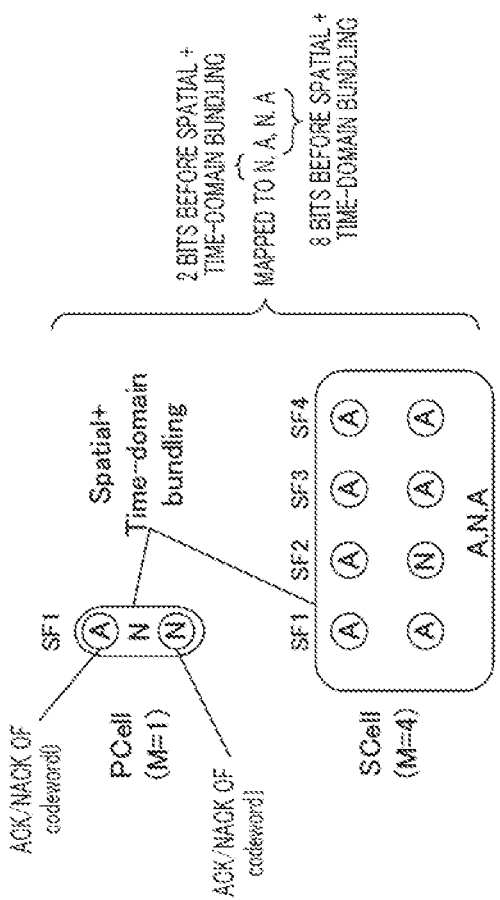
FIG. 17 illustrates an example of bundling processing according to Embodiment 3 of the present invention.

A case will be described as an example below where two CCs (one PCell, one SCell) are configured for terminal 200 as shown in FIG. 17 as in the case of Embodiment 1 (FIG. 11). Furthermore, as shown in FIG. 17, M=1 is set in PCell and M=4 is set in SCell. In FIG. 17, the result of error detection corresponding to CW0 of PCell is ACK(A) and the result of error detection corresponding to CW1 of PCell is NACK(N). In FIG. 17, the results of error detection corresponding to CW0 of SCell are "ACK, ACK, ACK, ACK" in order of subframes (SF) 1, 2, 3, 4. In FIG. 17, the results of error detection corresponding to CW1 of SCell are "ACK, NACK, ACK, ACK" in order of subframes (SF) 1, 2, 3, 4.

Hereinafter, spatial bundling and time-domain bundling in response signal generating section 212 will be described.

(Spatial Region and Time-Domain Bundling)

When the total number of bits of each component carrier before bundling is greater than the number of bits for reporting results of error detection (number of bits of ACK/NACK signals), response signal generating section 212 performs bundling.

For example, in FIG. 17, before performing bundling, the result of error detection of PCell is 2 bits and the result of error detection of SCell is 8 bits, bringing the total to 10 bits. In FIG. 17 (M=1 (MIMO) in PCell, M=4 in SCell), an ACK/NACK signal is transmitted using 4 bits. Thus, response signal generating section 212 performs spatial bundling and time-domain bundling for each component carrier to map 10 bits before bundling to a 4-bit mapping table.

Response signal generating section 212 determines the number of bits of results of error detection after bundling for each component carrier so that the bundling ratio (ratio of the number of bits of results of error detection after spatial region and time-domain bundling to the number of bits of results of error detection before bundling) becomes uniform between the component carriers. For example, response signal generating section 212 determines the number of bits of results of error detection after bundling for each component carrier based on the ratio of the number of bits of results of error detection before bundling between the component carriers.

To be more specific, response signal generating section 212 determines the number of bits of results of error detection in PCell after bundling and the number of bits of results of error detection in SCell after bundling based on the ratio between the number of bits of results of error detection in PCell before bundling and the number of bits of results of error detection in SCell before bundling. Response signal generating section 212 then performs bundling on results of error detection of each component carrier for each component carrier according to the determined number of bits.

For example, in FIG. 17, the number of bits of results of error detection of each component carrier before bundling is two in PCell and eight in SCell. That is, in FIG. 17, the bit ratio of results of error detection between PCell and SCell before bundling is 2:8 (=1:4).

First, response signal generating section 212 allocates bits (4 bits) for reporting ACK/NACK signals so that the ratio of the number of bits of results of error detection between PCell and SCell after bundling matches the ratio of the number of bits of results of error detection between PCell and SCell before bundling. For example, in FIG. 17, the ratio of the number of bits of results of error detection of PCell to the total number of bits of results of error detection (4 bits) after bundling becomes (2/10)×4=0.8. Likewise, in FIG. 17, the ratio of the number of bits of results of error detection of SCell to the total number of bits of results of error detection (4 bits) after bundling becomes (8/10)×4=3.2.

Next, response signal generating section 212 determines the number of bits of results of error detection after bundling so that the total number of bits of results of error detection after bundling becomes four (number of bits of ACK/NACK signals), the total number of bits becomes a natural number of bits for each component carrier and the difference in the bundling ratio between component carriers becomes a minimum.

That is, response signal generating section 212 sets the ratio between the number of bits of results of error detection in PCell after bundling and the number of bits of results of error detection in SCell after bundling in the number of bits (4 bits in FIG. 17) of ACK/NACK signals to a natural number approximate to the ratio between the number of bits of results of error detection in PCell before bundling and the number of bits of results of error detection in SCell before bundling. Furthermore, response signal generating section 212 minimizes the difference in the bundling ratio (the ratio of the number of bits of results of error detection after bundling to the number of bits of results of error detection before bundling) between PCell and SCell. Moreover, response signal generating section 212 makes the total number of bits of results of error detection in PCell and SCell after bundling equal to the number of bits (4 bits) of ACK/NACK signals.

For example, in FIG. 17, according to the ratio of the number of bits of results of error detection (1:4) between PCell and SCell before bundling, the bit ratio of results of error detection between PCell and SCell with respect to the ACK/NACK signals (4 bits) after bundling is 0.8:3.2 (=1:4). Thus, response signal generating section 212 determines a ratio (1:3) which is a natural number approximate to the above-described ratio (0.8:3.2), bringing the total to 4 bits as the ratio of results of error detection between PCell and SCell after bundling. Thus, in FIG. 17, response signal generating section 212 performs spatial bundling and time-domain bundling for each component carrier so that the number of bits of results of error detection after bundling becomes one in PCell and three in SCell.

In FIG. 17, while the number of bits of results of error detection in PCell before bundling is two, it is one after bundling. Thus, response signal generating section 212 performs spatial region and time-domain bundling to reduce the number of bits of results of error detection from two to one. On the other hand, in FIG. 17, while the number of bits of results of error detection before bundling in SCell is eight, it is three after bundling. Thus, response signal generating section 212 performs spatial region and time-domain bundling to reduce the number of bits of results of error detection from eight to three.

In Embodiment 1, time-domain bundling is performed after spatial bundling. In the present embodiment, time-domain bundling need not always be performed after spatial bundling, and in this respect, the present embodiment is different from Embodiment 1.

For example, a case will be described where response signal generating section 212 performs spatial bundling and time-domain bundling in SCell in FIG. 17 to reduce the number of bits of results of error detection from eight to three. In this case, response signal generating section 212 may also adopt a method of bundling results of error detection (total 3 bits) corresponding to CW0 and CW1 of subframe (SF) 1 and CW0 of SF2 into one bit, bundling results of error detection (total 3 bits) corresponding to CW1 of SF2 and CW0 and CW1 of SF3 into another one bit and bundling results of error detection (total 2 bits) corresponding to remaining CW0 and CW1 of SF4 into the remaining one bit.

Thus, in FIG. 17, the bundling ratio (the ratio of the number of bits of results of error detection after bundling to the number of bits of results of error detection before bundling) is 0.5 (=1/2) in PCell and 0.375 (=3/8) in SCell. Furthermore, the difference in the bundling ratio between the component carriers is 0.5−0.375=0.125.

Figure 18:
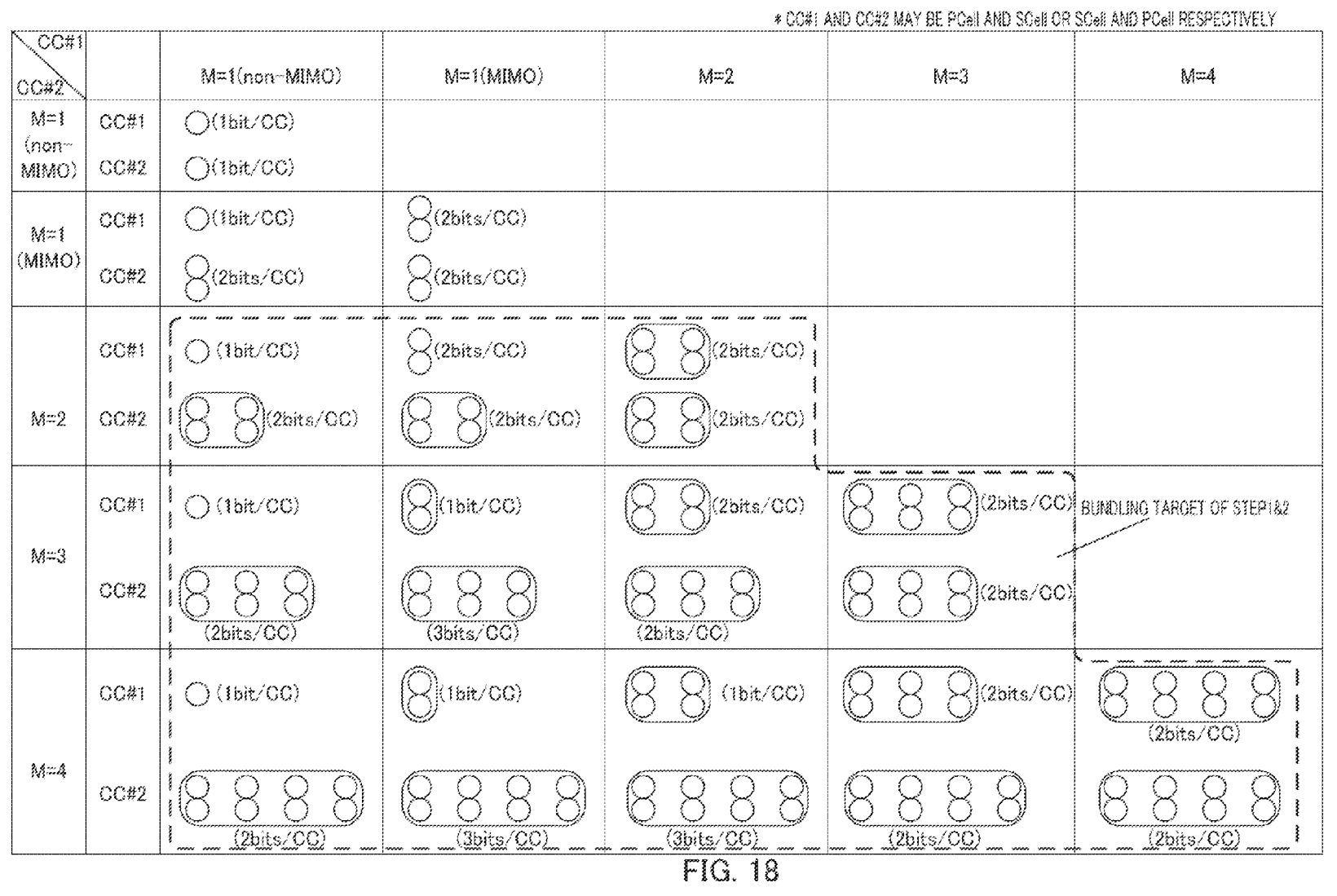

FIG. 18 illustrates a bundling method including combinations of other values of M other than the aforementioned combination of M=1 (MIMO) in PCell and M=4 in SCell. As shown in FIG. 18, when the sum of the numbers of bits of results of error detection before bundling of the respective component carriers is greater than the number of bits used for mapping in Step3, response signal generating section 212 performs bundling (that is, Step1 and Step2).

For example, when the number of bits of results of error detection before spatial bundling and time-domain bundling shown in FIG. 18 is four or more, the number of bits used for mapping in Step3 is four. Likewise, when the number of bits of results of error detection before spatial bundling and time-domain bundling shown in FIG. 18 is three, the number of bits used for mapping in Step3 is three just as is and when the number of bits of results of error detection before spatial bundling and time-domain bundling shown in FIG. 18 is two, the number of bits is also two just as is. However, as shown in FIG. 18, when M=1 (non-MIMO) for one component carrier and M=3 or M=4 for the other, the number of bits used for mapping in Step3 is three. However, when M=1 (non-MIMO) for one component carrier and M=3 or M=4 for the other, the number of bits used for mapping in Step3 may be four. In this case, the number of bits to be allocated corresponding to the component carrier with M=1 (non-MIMO) is assumed to be one and the number of bits to be allocated corresponding to the component carrier with M=2, M=3 or M=4 is assumed to be three.

As described above, in the present embodiment, terminal 200 makes the bundling ratios uniform with respect to each component carrier, and can thereby avoid deterioration of the accuracy of detecting results of error detection of some of a plurality of component carriers that can be determined by base station 100. This makes it possible to reduce the probability of missing ACK/NACK information for a component carrier with higher priority due to bundling. Thus, according to the present embodiment, it is possible to improve transmission efficiency of ACK/NACK information in all component carriers set for terminal 200.

According to the present invention, when ARQ is applied in communication using an uplink component carrier and a plurality of downlink component carriers associated with the uplink component carrier, and when a UL-DL configuration (ratio between UL subframes and DL subframes) set for each component carrier varies, it is possible to correctly transmit and receive results of error detection by bundling a plurality of results of error detection.

(Embodiment 4)

The present embodiment is similar to Embodiment 3 in that terminal 200 (FIG. 10) determines the number of bits of results of error detection to be reported to base station 100 (FIG. 9) based on the number of bits of results of error detection (ratio of the number of bits between CCs) of each CC before bundling. In Embodiment 3, terminal 200 performs bundling for each CC individually and thereby allocates bits so that the bundling ratio becomes uniform between CCs. In contrast, the present embodiment is different from Embodiment 3 in that terminal 200 performs bundling (in the spatial region, time domain and frequency domain) across all CCs so that the bundling ratio becomes uniform between CCs.

To be more specific, response signal generating section 212 of terminal 200 performs spatial region, time-domain bundling and frequency-domain bundling so that the number of bits of results of error detection of all CCs before bundling becomes the number of bits to be mapped in Step3 in FIG. 6A (number of bits of ACK/NACK signals).

Figure 19:
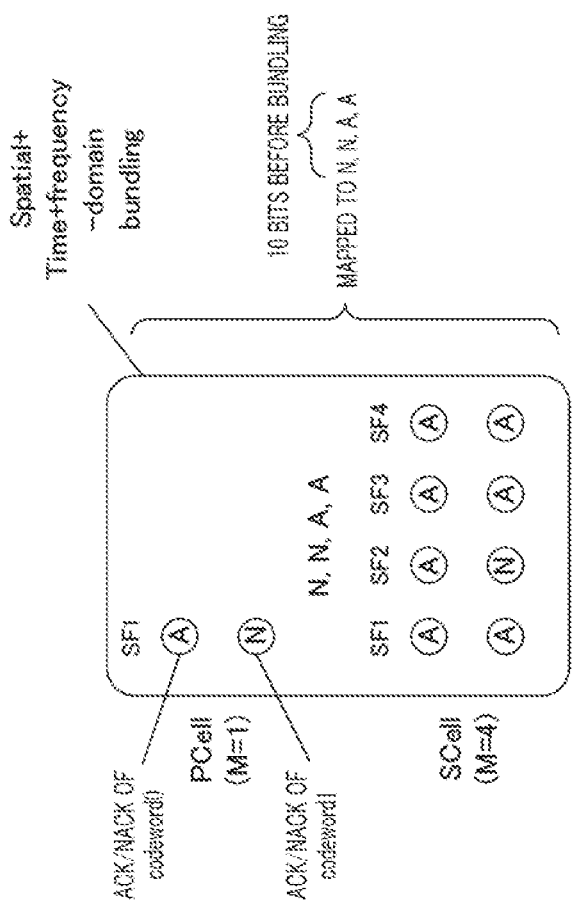
FIG. 19 illustrates an example of bundling processing according to Embodiment 4 of the present invention.

A case will be described below as an example where as in the case of Embodiment 1 (FIG. 11), two CCs (one PCell, one SCell) are set for terminal 200 as shown in FIG. 19. Moreover, as shown in FIG. 19, M=1 is set in PCell and M=4 is set in SCell. In FIG. 19, the result of error detection for CW0 of PCell is ACK(A) and the result of error detection for CW1 of PCell is NACK(N). Furthermore, in FIG. 19, the results of error detection corresponding to CW0 of SCell are "ACK, ACK, ACK, ACK" in order of subframes (SF) 1, 2, 3, 4. In FIG. 19, the results of error detection corresponding to CW1 of SCell are "ACK, NACK, ACK, ACK" in order of subframes (SF) 1, 2, 3, 4.

Hereinafter, "spatial region, time-domain and frequency-domain bundling" in response signal generating section 212 will be described.

(Spatial Region, Time-Domain and Frequency-Domain Bundling)

When the total number of bits of each component carrier before bundling is greater than the number of bits for reporting results of error detection (number of bits of ACK/NACK signals), response signal generating section 212 performs bundling.

In FIG. 19, before bundling, the result of error detection of PCell is 2 bits and the result of error detection of SCell is 8 bits, bringing the total to 10 bits. In FIG. 15 (M=1 (MIMO) in PCell, M=4 in SCell), an ACK/NACK signal is transmitted using 4 bits. Response signal generating section 212 then performs bundling in the spatial region, time-domain and frequency-domain over PCell and SCell to map 10 bits before bundling to a 4-bit mapping table.

To be more specific, in FIG. 19, response signal generating section 212 performs bundling in the spatial region, time-domain and frequency-domain on results of error detection of PCell and SCell before bundling (total 10 bits) over PCell and SCell. That is, in FIG. 19, response signal generating section 212 performs bundling in the spatial region, time-domain and frequency-domain using a bundling method of bundling from 10 bits to 4 bits.

The following is an example of the method of spatial region, time-domain and frequency-domain bundling from 10 bits to 4 bits. For example, in FIG. 19, response signal generating section 212 may bundle results of error detection (total 3 bits) corresponding to CW0 and CW1 in subframe (SF) 1 of PCell and CW0 in SF1 of SCell into 1 bit, bundle results of error detection (total 3 bits) corresponding to CW1 in SF1 of SCell and CW0 and CW1 in SF2 of SCell into 1 bit, bundle results of error detection (total 2 bits) corresponding to CW0 and CW1 in SF3 of SCell into 1 bit and bundle results of error detection (total 2 bits) corresponding to CW0 and CW1 in SF4 of SCell into 1 bit.

Thus, in FIG. 19, the bundling ratio (the ratio of the number of bits of results of error detection after bundling to the number of bits of results of error detection before bundling) is 0.4 (=((2/10)×4)/2) in PCell and 0.4 (=((8/10)×4)/8) in SCell, making it clear that the bundling ratio is completely smoothed out between the component carriers. In other words, in the number of bits of ACK/NACK signals, the ratio (1:4) between the number of bits (0.8 bits) corresponding to results of error detection of PCell and the number of bits (3.2 bits) corresponding to results of error detection of SCell is the same as the ratio (1:4) between the number of bits (1 bit) of results of error detection in PCell immediately after spatial bundling and the number of bits (4 bits) of results of error detection in SCell immediately after spatial bundling. That is, the present embodiment (FIG. 19) can smooth out the bundling ratio between the component carriers more than the bundling method shown in Embodiment 3 (difference in the bundling ratio between component carriers: 0.125).

Figure 20:
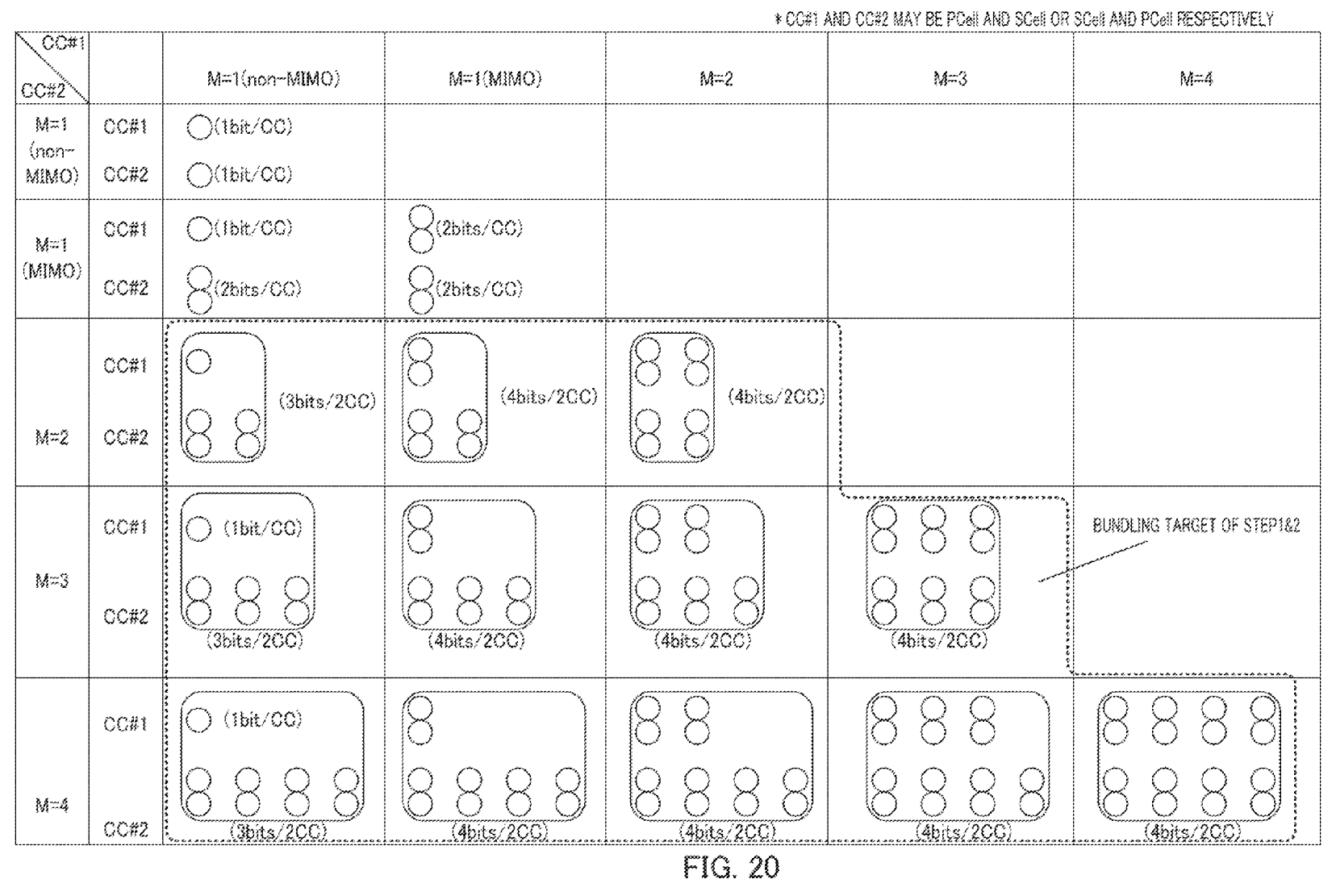

FIG. 20 illustrates a bundling method including combinations of other values of M other than the aforementioned combination of M=1 (MIMO) in PCell and M=4 in SCell. As shown in FIG. 20, when the sum of the numbers of bits of results of error detection before bundling of the respective component carriers is greater than the number of bits used for mapping in Step3 (the number of bits of ACK/NACK signals), response signal generating section 212 performs bundling in the spatial region, time-domain and frequency-domain (that is, Step 1 and Step2).

The number of bits used for mapping in Step3 is four when the number of bits of results of error detection before bundling in the spatial region, time-domain and frequency-domain shown, for example, in FIG. 20 is four or more. Likewise, when the number of bits of results of error detection before bundling in the spatial region, time-domain and frequency-domain shown in FIG. 20 is three, the number of bits used for mapping in Step3 is three just as is, and when the number of bits of results of error detection before bundling in the spatial region, time-domain and frequency-domain shown in FIG. 20 is two, the number of bits is also two just as is. However, as shown in FIG. 20, when M=1 (non-MIMO) for one component carrier and M=2, M=3 or M=4 for the other, the number of bits used for mapping in Step3 is three. However, when M=1 (non-MIMO) for one component carrier and M=2, M=3 or M=4 for the other, the number of bits used for mapping in Step3 may be four.

In this way, in the present embodiment, terminal 200 makes the bundling ratio uniform with respect to each component carriers, and can thereby avoid deterioration of the detection accuracy of results of error detection of some of a plurality of component carriers that can be determined by base station

100 in the same way as in Embodiment 1. This makes it possible to reduce the probability of missing ACK/NACK information for a component carrier with higher priority due to bundling. Thus, according to the present embodiment, it is possible to improve transmission efficiency of ACK/NACK information in all component carriers configured for terminal 200.

According to the present invention, when ARQ is applied in communication using an uplink component carrier and a plurality of downlink component carriers associated with the uplink component carrier, and when a UL-DL configuration (ratio between UL subframes and DL subframes) set for each component carrier varies, it is possible to correctly transmit and receive results of error detection by bundling a plurality of results of error detection.

(Embodiment 5)

Figure 7:
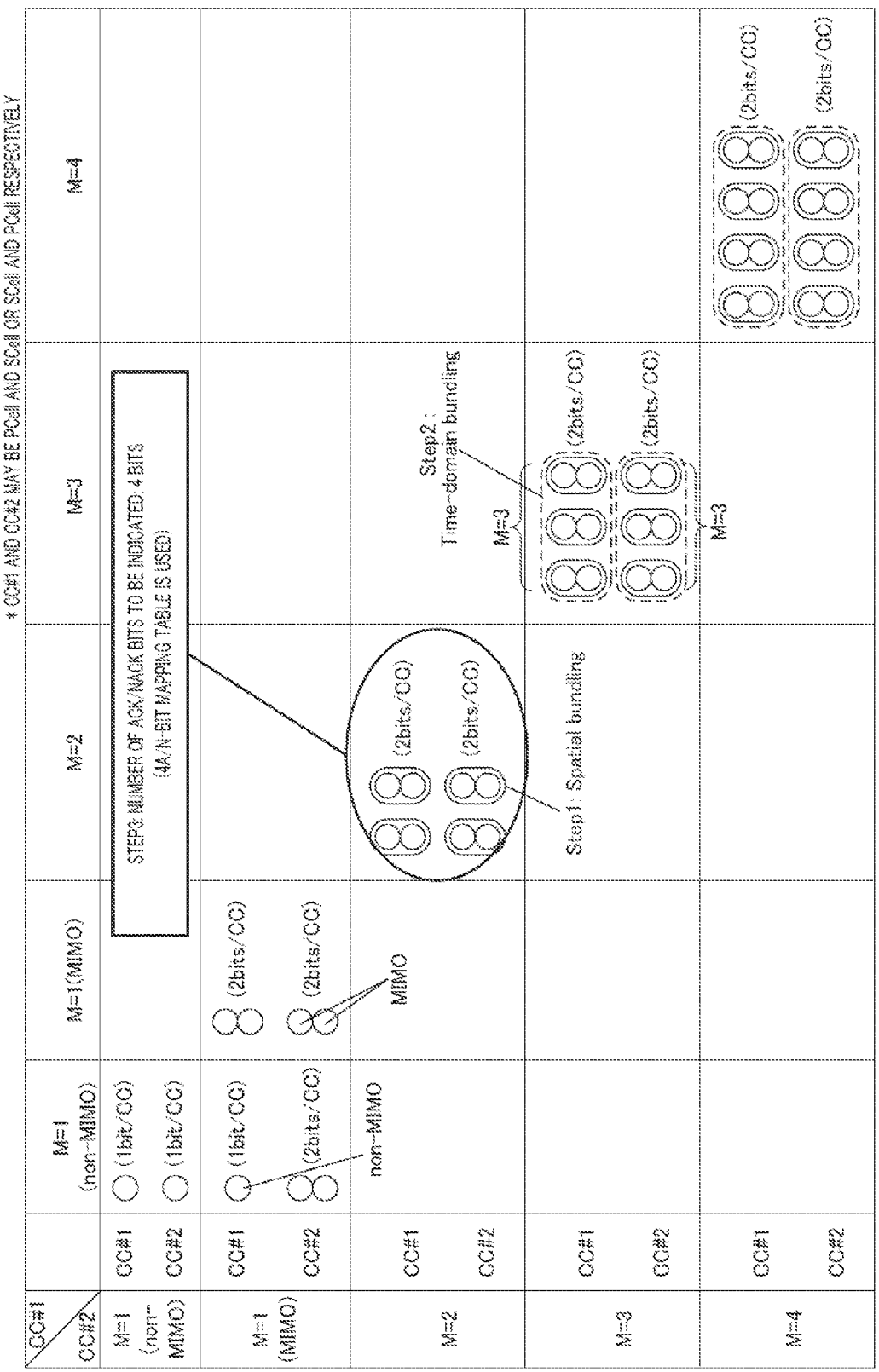
FIG. 7 is a table provided for describing a bundling method and a mapping method in TDD.
Figure 21:
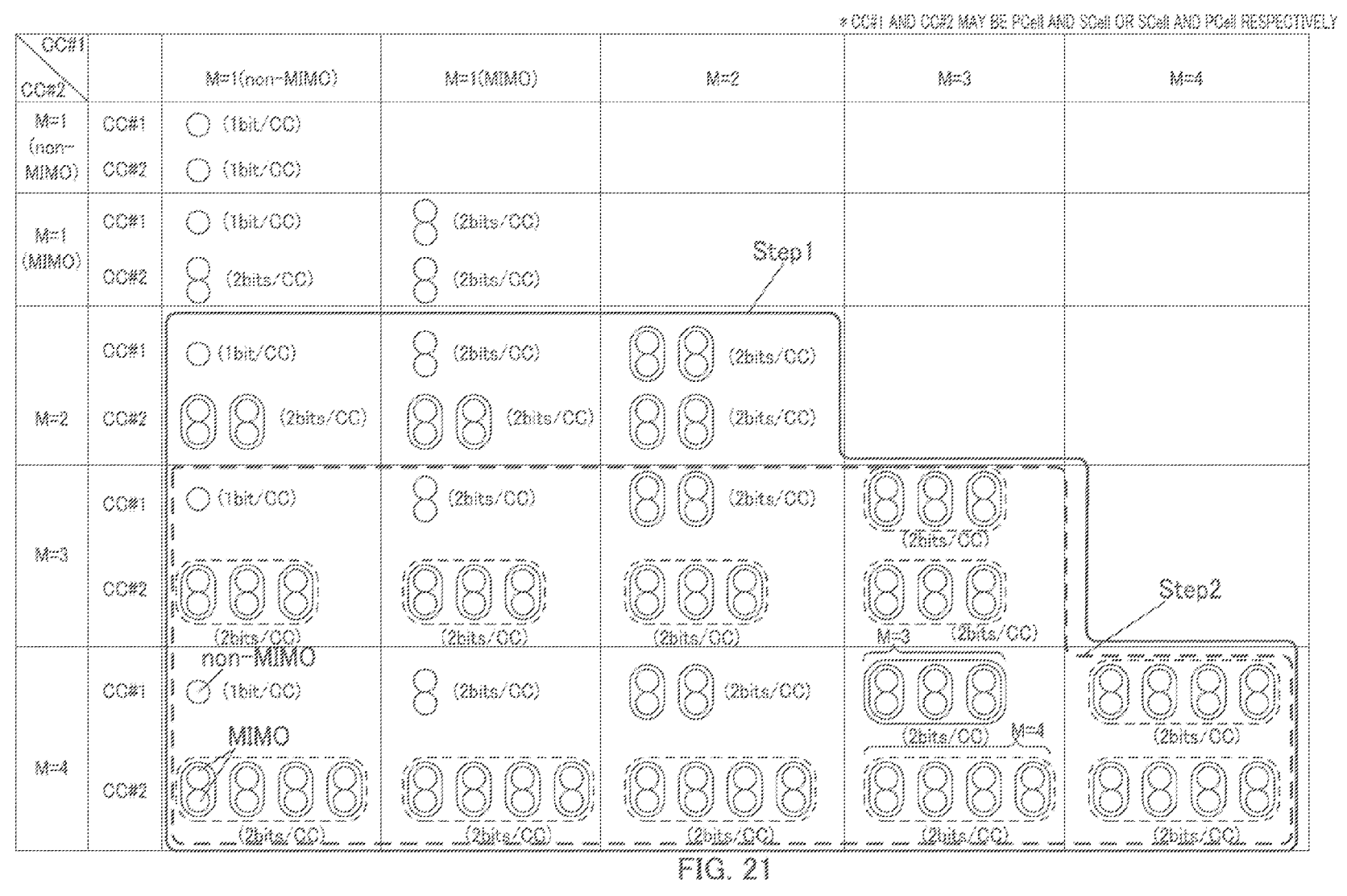

FIG. 21 illustrates the value of M, the bundling method and the number of bits for reporting results of error detection in each component carrier (portion in the diagonal direction shown in FIG. 21) when the UL-DL configuration is the same between the component carriers as in the case of FIG. 7. Furthermore, FIG. 21 illustrates the value of M, the bundling method and the number of bits for reporting results of error detection in each component carrier when the UL-DL configuration varies from one component carrier to another and the UL subframe timing matches between the component carriers (left bottom part in FIG. 21).

Since the right top part in FIG. 21 is nothing more than the combination at the left bottom part with CC#1 and CC#2 switched round, the description thereof is omitted.

As shown in FIG. 21 (or FIG. 7), when the UL-DL configuration is the same between the component carriers, the bundling method and the number of bits for reporting results of error detection are independently set for each component carrier. Thus, according to the present embodiment, even when the UL-DL configuration varies from one component carrier to another as shown in FIG. 21, terminal 200 (FIG. 10) likewise configures the bundling method and the number of bits for reporting results of error detection independently for each component carrier.

To be more specific, in FIG. 21 (or FIG. 7), when the UL-DL configuration is the same between the component carriers, the number of bits of results of error detection after bundling for each component carrier is two in all cases where M=1 (MIMO), and M=2, 3, 4. Thus, in the present embodiment, as shown in FIG. 21, even when the UL-DL configuration varies from one component carrier to another, the number of bits of results of error detection after bundling is likewise assumed to be two in all cases where M=1 (MIMO), and M=2, 3, 4. Furthermore, as shown in FIG. 21, when M=1 (non-MIMO), the number of bits of results of error detection after bundling is assumed to be one.

As shown in FIG. 21, when the total number of bits of results of error detection of each component carrier before bundling is greater than 4 bits (number of bits of ACK/NACK signals), spatial bundling (part enclosed by a solid line in Step1 in FIG. 6A) is performed. Furthermore, as shown in FIG. 21, when the total number of bits of results of error detection of each component carrier after spatial bundling is greater than two (=4 bits (number of bits of ACK/NACK signals)/2 CCs), time-domain bundling (part enclosed by a broken line in Step2 in FIG. 6A) is further performed.

Figure 22:
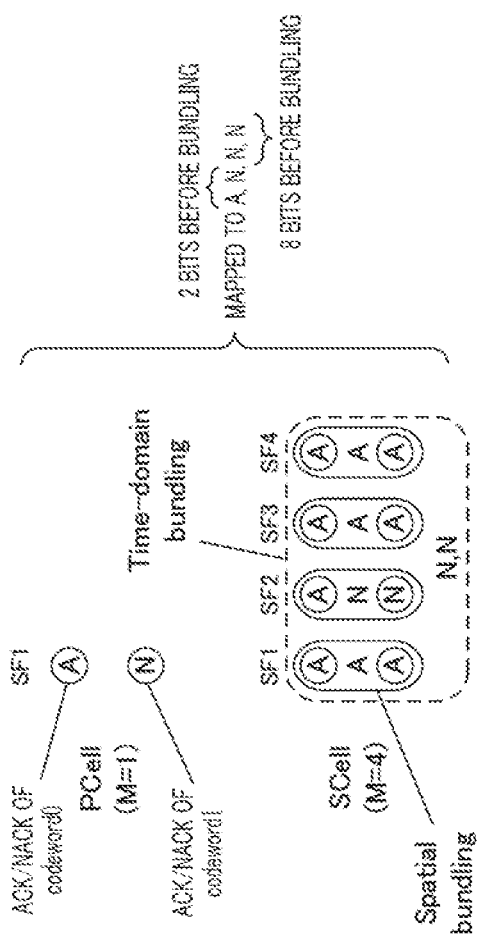
FIG. 22 illustrates an example of bundling processing according to Embodiment 5 of the present invention.

A case will be described as an example below where as shown in FIG. 22, two CCs (one PCell, one SCell) are set for terminal 200 as in the case of Embodiment 1 (FIG. 11). Furthermore, as shown in FIG. 22, M=1 is set in PCell and M=4 is set in SCell. In FIG. 22, the result of error detection corresponding to CW0 of PCell is ACK(A) and the result of error detection corresponding to CW1 of PCell is NACK(N). In FIG. 22, the results of error detection corresponding to CW0 of SCell are "ACK, ACK, ACK, ACK" in order of subframes (SF) 1, 2, 3, 4. In FIG. 22, the results of error detection corresponding to CW1 of SCell are "ACK, NACK, ACK, ACK" in order of subframes (SF) 1, 2, 3, 4. In FIG. 22 (M=1 (MIMO) in PCell, M=4 in SCell), results of error detection of each component carrier are transmitted using two bits each.

As shown in FIG. 22, in PCell with M=1 (MIMO), response signal generating section 212 of terminal 200 (FIG. 10) does not perform bundling on the 2-bit result of error detection. That is, terminal 200 maps the 2-bit result of error detection of PCell just as is (Step3).

On the other hand, as shown in FIG. 22, in SCell with M=4 (MIMO), response signal generating section 212 performs spatial bundling (Step1) and time-domain bundling (Step2) on an 8-bit result of error detection before bundling. Thus, terminal 200 maps the 2-bit results of error detection (NACK, NACK) obtained through bundling (Step3).

That is, in FIG. 22, terminal 200 maps the results of error detection of 2 bits of PCell (ACK, NACK) and the results of error detection of 2 bits of SCell (NACK, NACK), a total of 4 bits (ACK, NACK, NACK, NACK) based on the mapping table.

In FIG. 22, the bundling ratio (the ratio of the number of bits of results of error detection after bundling to the number of bits of results of error detection before bundling) is 1.0 (=2/2) in PCell and 0.25 (=2/8) in SCell.

As described above, the present embodiment has shown the bundling method when the UL-DL configuration varies from one component carrier to another.

In this way, according to the present embodiment, as in the case of Embodiment 1, when ARQ is applied in communication using an uplink component carrier and a plurality of downlink component carriers associated with the uplink component carrier, and when a UL-DL configuration (ratio between UL subframes and DL subframes) set for each component carrier varies, it is possible to correctly transmit and receive results of error detection by bundling a plurality of results of error detection.

Furthermore, when the UL-DL configuration set for each component carrier varies, the bundling method in the present embodiment is set in the same way as in the case of related art (case where the UL-DL configuration is the same between component carriers). That is, bundling processing is performed independently for each component carrier. Thus, according to the present embodiment, terminal 200 can reduce an increase in the circuit configuration from the conventional one.

In a combination of the component carrier with M=1 (non-MIMO) and the component carriers with M=2, M=3 or M=4, the present embodiment determines the number of bits (3 bits in this case) for reporting results of error detection based on the independent numbers of bits for each component carrier instead of determining the number of bits for reporting results of error detections as 4 bits in accordance with the number of bits per component carrier with M=2, M=3 or M=4. This makes it possible to maintain the bundling ratio per component carrier equivalent to the case of related art (when the UL-DL configuration is the same between the component carriers) while suppressing an increase in the number of PUCCH resources (A/N resources) caused by an increase in the number of bits for reporting results of error detection. Thus, according to the present embodiment, it is possible to maintain the detection accuracy of results of error detection per component carrier in the base station equivalent to the conventional one.

The embodiments of the present invention have been described thus far.

A case has been described in Embodiment 1 and Embodiment 2 where a terminal allocates bits of results of error detection to be reported to a base station based on the number of bits of results of error detection of each CC after spatial bundling. On the other hand, a case has been described in Embodiment 3 and Embodiment 4 where a terminal allocates bits of results of error detection to be reported to a base station based on the number of bits of results of error detection of each CC before bundling. That is, a case has been described in Embodiments 1 to 4 where the number of bits of results of error detection is used as a reference for bit allocation of results of error detection. This is because the greater the number of bits of results of error detection, the more results of error detection can be bundled into a smaller number of bits, and therefore even when a certain result of error detection is ACK, another result of error detection may be NACK, and NACK is more likely to be reported to the base station as a consequence. That is, the terminal allocates bits of results of error detection to a component carrier having more bits of results of error detection with higher priority. However, the reference for bit allocation of results of error detection is not limited to this case. Other references of bit allocation of results of error detection will be described below.

Another example of allocation reference is the number of DL subframes per frame. For example, in the UL-DL configuration shown in FIG. 3, the number of DL subframes (D) per frame is smaller in Config 0 (4 subframes) than in Config 2 (12 subframes). Therefore, Config 0 has fewer chances to retransmit downlink communication data than Config 2. Therefore, the terminal may allocate bits for results of error detection corresponding to a component carrier for which a UL-DL configuration having fewer DL subframes per frame is set with higher priority. That is, the terminal allocates more bits of results of error detection to a component carrier for which a UL-DL configuration having fewer DL subframes per frame is set.

A further example of allocation reference is an amount of interference. A component carrier having a large amount of interference is more susceptible to errors, and is therefore more likely to report NACK. Therefore, the terminal may allocate bits of results of error detection to a component carrier having a large amount of interference with higher priority. That is, the terminal allocates more bits of results of error detection to a component carrier having a large amount of interference.

A still further example of allocation reference is an allowable amount of delay of a radio communication system. For example, an LTE band is required to have a lower delay than a GSM (registered trademark) band. For this reason, the LTE band has higher required performance for retransmission than the GSM (registered trademark) band. Therefore, the terminal may allocate bits of results of error detection to a component carrier having an LTE band for which a low delay is required with higher priority. That is, the terminal allocates more bits of results of error detection to a component carrier having an LTE band than a component carrier having a GSM (registered trademark) band.

Moreover, the terminal may be capable of switching between the above-described allocation references by means of setting.

Figure 23:
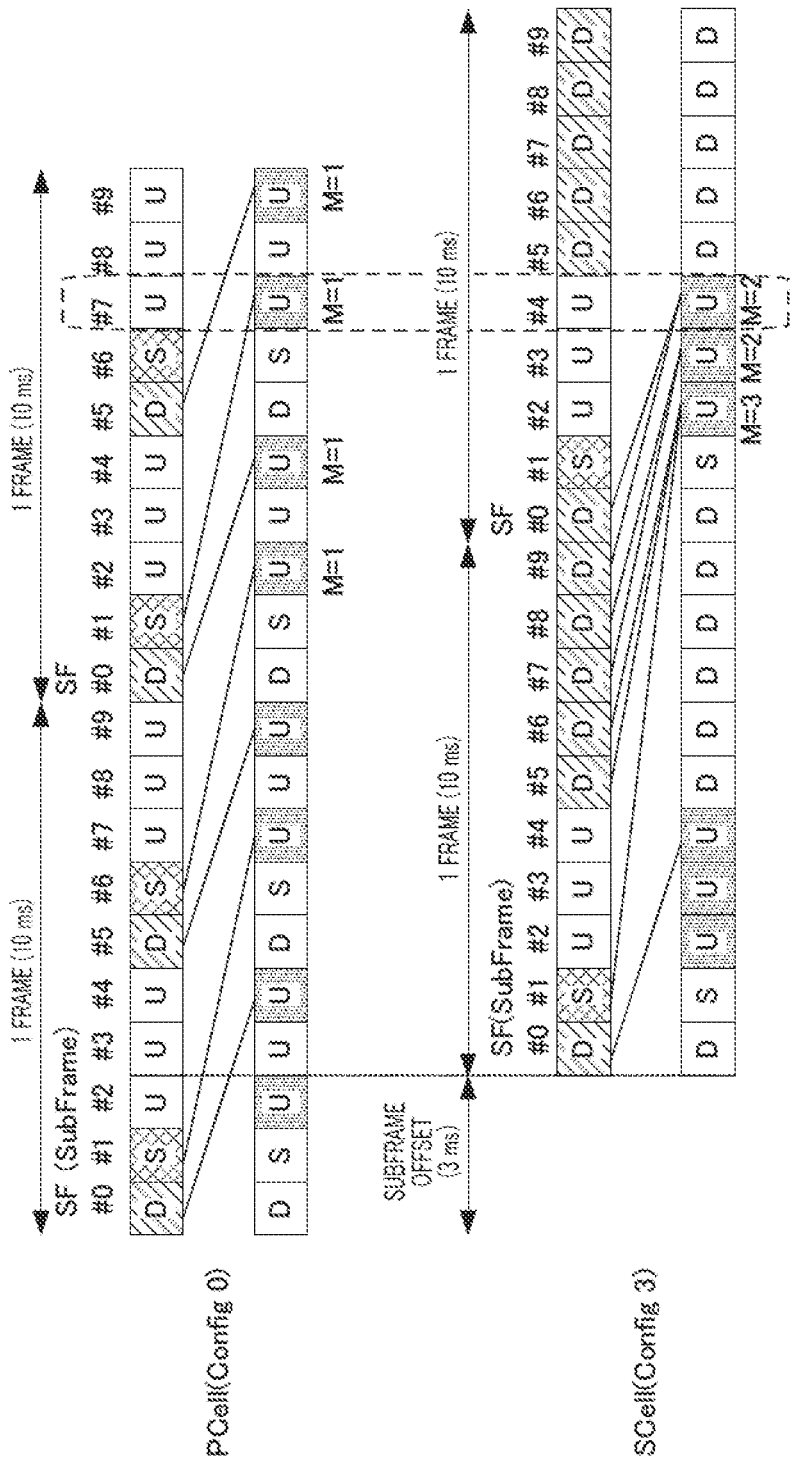
FIG. 23 is a diagram provided for describing bundling according to a variation of the present invention.

A case has been described in the above embodiments where the frame starting position is the same between CCs for which different UL-DL configurations are set. However, the present invention is not limited to this case, and is also applicable to cases where UL subframe timing is the same between component carriers even when their frame starting positions are different. For example, as shown in FIG. 23, when Config 0 is set in PCell, Config 3 is set in SCell and there is a subframe offset corresponding to three subframes of SCell from PCell, the present invention is applicable in subframe #7 in PCell.

The above embodiments have described the bundling method when UL subframe timing matches between component carriers. However, when UL subframe timing does not match, the terminal may always report results of error detection of PCell and SCell from PCell or report results of error detection of PCell from PCell or report results of error detection of SCell from SCell.

Although an antenna has been described in the aforementioned embodiments, the present invention may be similarly applied to an antenna port.

The term "antenna port" refers to a logical antenna including one or more physical antennas. In other words, the term "antenna port" does not necessarily refer to a single physical antenna, and may sometimes refer to an array antenna including a plurality of antennas, and/or the like.

For example, how many physical antennas are included in the antenna port is not defined in LTE, but the antenna port is defined as the minimum unit allowing the base station to transmit different reference signals in LTE.

In addition, an antenna port may be specified as a minimum unit to be multiplied by a precoding vector weighting.

In the foregoing embodiments, the present invention is configured with hardware by way of example, but the invention may also be provided by software in cooperation with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosures of Japanese Patent Application No. 2011-125241, filed on Jun. 3, 2011, including the specifications, drawings and abstracts are incorporated herein by reference in their entirety.

INDUSTRIAL APPLICABILITY

The present invention is suitable for use in mobile communication systems or the like.

REFERENCE SIGNS LIST

100 Base station
200 Terminal 101, 208 Control section
102 Control information generating section
103, 105 Coding section
104, 107 Modulation section
106 Data transmission controlling section
108 Mapping section
109, 218 IFFT section
110, 219 CP adding section
111, 222 Radio transmitting section
112, 201 Radio receiving section
113, 202 CP removing section
114 PUCCH extracting section
115 Despreading section
116 Sequence control section
117 Correlation processing section
118 A/N determining section
119 Bundled A/N despreading section
120 IDFT section
121 Bundled A/N determining section
122 Retransmission control signal generating section
203 FFT section
204 Extraction section
205, 209 Demodulation section
206, 210 Decoding section
207 Determination section
211 CRC section
212 Response signal generating section
213 Coding and modulation section
214 Primary-spreading section
215 Secondary-spreading section
216 DFT section
217 Spreading section
220 Time multiplexing section
221 Selection section

The invention claimed is:

1. A terminal apparatus configured to communicate with a base station apparatus using a first component carrier and a second component carrier and to report, to the base station apparatus, a response signal generated by performing bundling including spatial bundling and time-domain bundling on results of error detection of downlink data items, the terminal apparatus comprising one or more integrated circuits configured to:
receive the downlink data items using the first component carrier and the second component carrier, respectively;
detect an error in each of the downlink data items; and
generate the response signal by performing bundling on the results of error detection based on a ratio of a number of bits of results of error detection between the first component carrier and the second component carrier so that a total number of bits of results of error detection of the downlink data items obtained in the error detection becomes a number of bits for reporting the response signal,
wherein time-domain bundling on results of error detection of the first component carrier and results of error detection of the second component carrier is performed for each component carrier based on a ratio of a number of bits of results of error detection between the first component carrier and the second component carrier after the spatial bundling;
wherein
the one or more integrated circuits are further configured to determine, based on a ratio between a first number of bits of a result of error detection of the first component carrier immediately after spatial bundling and a second number of bits of a result of error detection in the second component carrier immediately after spatial bundling, a third number of bits of a result of error detection in the first component carrier after time-domain bundling and a fourth number of bits of a result of error detection in the second component carrier after time-domain bundling, respectively; and
a ratio between the third number of bits and the fourth number of bits with respect to the number of bits for reporting the response signal is a natural number approximate to the ratio between the first number of bits and the second number of bits, and a difference between a ratio of the third number of bits to the first number of bits and a ratio of the fourth number of bits to the second number of bits becomes a minimum, while the sum of the third number of bits and the fourth number of bits is equal to the number of bits for reporting the response signal.

2. The terminal apparatus according to claim 1, wherein:
the one or more integrated circuits are further configured to perform time-domain bundling and frequency-domain bundling on results of error detection in the first component carrier immediately after spatial bundling and results of error detection in the second component carrier immediately after spatial bundling across all component carriers; and
a ratio between the number of bits corresponding to a result of error detection of the first component carrier and the number of bits corresponding to a result of error detection of the second component carrier with respect to the number of bits for reporting the response signal is identical to a ratio between the number of bits of a result of error detection in the first component carrier immediately after spatial bundling and the number of bits of a result of error detection in the second component carrier immediately after spatial bundling.

3. A terminal apparatus configured to communicate with a base station apparatus using a first component carrier and a second component carrier and to report, to the base station apparatus, a response signal generated by performing bundling including spatial bundling and time-domain bundling on results of error detection of downlink data items, the terminal apparatus comprising one or more integrated circuits configured to:
receive the downlink data items using the first component carrier and the second component carrier, respectively;
detect an error in each of the downlink data items; and
generate the response signal by performing bundling on the results of error detection based on a ratio of a number of bits of results of error detection between the first component carrier and the second component carrier so that a total number of bits of results of error detection of the downlink data items obtained in the error detection becomes a number of bits for reporting the response signal,
wherein the bundling on results of error detection of the first component carrier and results of error detection of the second component carrier is performed for each component carrier based on the ratio of the number of bits of results of error detection between the first component carrier and the second component carrier before bundling;
wherein
the one or more integrated circuits configured to determine, based on a ratio between a first number of bits of results of error detection of the first component carrier before bundling and a second number of bits of results of error detection in the second component carrier before bundling, a third number of bits of results of error detection in the first component carrier after bundling and a fourth number of bits of results of error detection in the second component carrier after bundling, respectively; and a ratio between the third number of bits and the fourth number of bits with respect to the number of bits for reporting the response signal is a natural number approximate to the ratio between the first number of bits and the second number of bits, and a difference between a ratio of the third number of bits to the first number of bits and a ratio of the fourth number of bits to the second number of bits becomes a minimum, while the sum of the third number of bits and the fourth number of bits is equal to the number of bits for reporting the response signal.

4. The terminal apparatus according to claim 3, wherein:

the one or more integrated circuits are further configured to perform spatial bundling, time-domain bundling and frequency-domain bundling on results of error detection in the first component carrier before bundling and results of error detection in the second component carrier before bundling across all component carriers; and a ratio between the number of bits corresponding to results of error detection of the first component carrier and the number of bits corresponding to results of error detection of the second component carrier with respect to the number of bits for reporting the response signal is identical to a ratio between the first number of bits of results of error detection in the first component carrier before bundling and the second number of bits of results of error detection in the second component carrier before bundling.

5. A response signal generating method in a terminal apparatus configured to communicate with a base station apparatus using a first component carrier and a second component carrier and to report, to the base station apparatus, a response signal generated by performing bundling including spatial bundling and time-domain bundling on results of error detection of downlink data, the method comprising:

receiving downlink data items using the first component carrier and the second component carrier, respectively;

detecting an error in each of the downlink data items; and generating the response signal by performing bundling on the results of error detection based on a ratio of the number of bits of results of error detection between the first component carrier and the second component carrier so that a total number of bits of results of error detection of the downlink data items obtained in the error detection becomes a number of bits for reporting the response signal, wherein the time-domain bundling is performed on results of error detection of the first component carrier and results of error detection of the second component carrier for each component carrier based on a ratio of a number of bits of results of error detection between the first component carrier and the second component carrier after the spatial bundling;

wherein a third number of bits of a result of error detection in the first component carrier after time-domain bundling and a fourth number of bits of a result of error detection in the second component carrier after time-domain bundling are determined based on a ratio between a first number of bits of a result of error detection of the first component carrier immediately after spatial bundling and a second number of bits of a result of error detection in the second component carrier immediately after spatial bundling; and a ratio between the third number of bits and the fourth number of bits with respect to the number of bits for reporting the response signal is a natural number approximate to the ratio between the first number of bits and the second number of bits, and a difference between a ratio of the third number of bits to the first number of bits and a ratio of the fourth number of bits to the second number of bits becomes a minimum, while the sum of the third number of bits and the fourth number of bits is equal to the number of bits for reporting the response signal.

* * * * *